(12) United States Patent
Suzuki

(10) Patent No.: US 11,496,604 B2
(45) Date of Patent: Nov. 8, 2022

(54) RESOURCE MANAGEMENT APPARATUS, RESOURCE MANAGEMENT SYSTEM, AND NON-TRANSITORY COMPUTER-EXECUTABLE MEDIUM

(71) Applicant: Ryo Suzuki, Kanagawa (JP)

(72) Inventor: Ryo Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/337,676

(22) Filed: Jun. 3, 2021

(65) Prior Publication Data

US 2021/0392201 A1 Dec. 16, 2021

(30) Foreign Application Priority Data

Jun. 12, 2020 (JP) .............................. JP2020-101957

(51) Int. Cl.
| | |
|---|---|
| G06F 15/173 | (2006.01) |
| H04L 67/62 | (2022.01) |
| H04L 41/0896 | (2022.01) |
| H04L 67/52 | (2022.01) |

(52) U.S. Cl.
CPC .......... H04L 67/62 (2022.05); H04L 41/0896 (2013.01); H04L 67/52 (2022.05)

(58) Field of Classification Search
CPC .... H04L 67/325; H04L 41/0896; H04L 67/18
USPC ....................................................... 709/226
See application file for complete search history.

(56) References Cited

U.S. PATENT DOCUMENTS

| | | | |
|---|---|---|---|
| 2015/0381594 A1* | 12/2015 | Venkatesan | G06F 16/955 726/6 |
| 2017/0205239 A1* | 7/2017 | Cline | G06T 11/206 |
| 2020/0296056 A1* | 9/2020 | Fukuta | H04L 41/0896 |

FOREIGN PATENT DOCUMENTS

| | | |
|---|---|---|
| JP | 2014-059593 | 4/2014 |
| JP | 2016-004511 | 1/2016 |

\* cited by examiner

*Primary Examiner* — Alan S Chou
(74) *Attorney, Agent, or Firm* — IPUSA, PLLC

(57) ABSTRACT

A resource management apparatus is communicable with a communication terminal that displays usage states of a plurality of resources. The resource management apparatus includes circuitry configured to transmit a request for reservation information indicating reservation contents of the plurality of resources to a reservation management apparatus that manages reservations of the plurality of resources, receive the reservation information relating to the plurality of resources transmitted by the reservation management apparatus, and transmit, to the communication terminal, image information of the plurality of resources, location information indicating locations of the plurality of resources, and usage states of the plurality of resources, and the received reservation information relating to the plurality of resources, the image information, the location information, and the usage states being managed by the resource management apparatus.

12 Claims, 22 Drawing Sheets

FIG. 5

RESOURCE ID: A101 (MEETING ROOM A)

| RESERVA-TION ID | ACCOUNT OF RESERVATION-MAKING USER | START DATE AND TIME | END DATE AND TIME | ACCOUNT OF EXPECTED PARTICIPANT |
|---|---|---|---|---|
| 001 | a@ricoh.ex.com | 2020/06/12 13:00 | 2020/06/12 14:00 | b@ricoh.ex.com c@ricoh.ex.com |
| 002 | aa@ricoh.ex.com | 2020/06/12 14:30 | 2020/06/12 15:30 | d@ricoh.ex.com e@ricoh.ex.com |
| ... | ... | ... | ... | ... |

FIG. 6A

LOGIN INFORMATION DB

| CUSTOMER ID | USER ID | LOGIN PASSWORD | SERVER URL |
|---|---|---|---|
| C001 | a@ricoh.ex.com | ************ | https://reserve.ricoh.ex.com/ |
| ... | ... | ... | ... |

FIG. 6B

RESOURCE STATE MANAGEMENT DB

| RESERVA- TION ID | ACCOUNT OF RESERVATION- MAKING USER | EVENT NAME | RESOURCE ID | START DATE AND TIME | END DATE AND TIME | ACCOUNT OF EXPECTED PARTICIPANT | USAGE STATE OF RESOURCE |
|---|---|---|---|---|---|---|---|
| 001 | a@ricoh.ex.com | PRODUCT Z DEVELOP- MENT MEETING | A101 | 2020/06/12 13:00 | 2020/06/12 14:00 | b@xfood.com c@xfood.com d@xfood.com | IN USE |
| 002 | e@ricoh.ex.com | PRODUCT Y DEVELOP- MENT MEETING | A103 | 2020/06/12 15:30 | 2020/06/12 15:30 | f@xfood.com g@xfood.com | WAITING FOR ENTRY |
| ... | ... | ... | ... | ... | ... | ... | ... |

FIG. 6C

RESOURCE IDENTIFICATION MANAGEMENT DB

| RESERVA- TION ID | RESOURCE ID | EVENT ID |
|---|---|---|
| 001 | A101 | 1234 |
| 002 | A103 | 5678 |
| ... | ... | ... |

FIG. 7

RESOURCE GROUP MANAGEMENT DB

| CUSTOMER ID | RESOURCE NAME | RESOURCE ID | RESOURCE STATE | AUTHEN-TICATION KEY | MANAGE-MENT START FLAG | RESOURCE GROUP | OPERATION RULE | GROUP ID | GROUP NAME |
|---|---|---|---|---|---|---|---|---|---|
| C001 | MEETING ROOM A | A101 | CONNECTED | ***** | True | A BUILDING MEETING ROOM | Default | G001 | A BUILDING, 1st FLOOR |
| | MEETING ROOM B | A102 | CONNECTED | ***** | False | A BUILDING MEETING ROOM | Default | | |
| | MEETING ROOM C | A103 | BEFORE SETUP | ***** | False | A BUILDING MEETING ROOM | Guest | G001 | A BUILDING, 1st FLOOR |
| | MEETING ROOM D | A104 | DISCON-NECTED | ***** | True | A BUILDING MEETING ROOM | Executive | G001 | A BUILDING, 1st FLOOR |
| | MEETING ROOM A | B101 | CONNECTED | ***** | False | B BUILDING MEETING ROOM | Default | G002 | B BUILDING, 1st FLOOR |
| | MEETING ROOM B | B102 | CONNECTED | ***** | False | B BUILDING MEETING ROOM | Default | G002 | B BUILDING, 1st FLOOR |
| | MEETING ROOM C | B103 | CONNECTED | ***** | False | B BUILDING MEETING ROOM | Default | | |
| | MEETING ROOM D | B104 | CONNECTED | ***** | False | B BUILDING MEETING ROOM | Default | | |

FIG. 8A

RESOURCE ID: A101 (MEETING ROOM A)

| RESERVA-TION ID | ACCOUNT OF RESERVATION-MAKING USER | START DATE AND TIME | END DATE AND TIME | ACCOUNT OF EXPECTED PARTICIPANT | RESOURCE STATE |
|---|---|---|---|---|---|
| 011 | a@ricoh.ex.com | 2020/06/13 10:00 | 2020/06/13 11:00 | b@ricoh.ex.com c@ricoh.ex.com d@ricoh.ex.com | IN USE (CHECKED-IN) |
| 012 | aa@ricoh.ex.com | 2020/06/13 14:30 | 2020/06/13 15:00 | f@ricoh.ex.com g@ricoh.ex.com | WAITING FOR ENTRY (NOTIFICATION SENT) |
| ... | ... | ... | ... | ... | ... |

FIG. 8B

CUSTOMER ID: C001 (Ricoh.ex.com)

| GROUP ID | RESOURCE ID | MAP IMAGE FILE (URL) | COORDINATE (x) [px] | COORDINATE (y) [px] |
|---|---|---|---|---|
| G001 | A101 | ../xx/ss/map.jpg | 900 | 800 |
| G001 | A102 | ../xx/ss/map.jpg | 1300 | 800 |
| G001 | A103 | ../xx/ss/map.jpg | 900 | 200 |
| G001 | A104 | ../xx/ss/map.jpg | 1600 | 200 |
| G001 | - | ../xx/ss/map.jpg | 600 | 300 |
| ... | ... | ... | ... | ... |

FIG. 9

| RESOURCE STATE | MARK |
|---|---|
| VACANT | ◆ |
| IN USE | ∨ |
| WAITING FOR ENTRY | ● |
| CURRENT LOCATION | 📍 |
| ... | ... |

RESOURCE MANAGEMENT APPARATUS, RESOURCE MANAGEMENT SYSTEM, AND NON-TRANSITORY COMPUTER-EXECUTABLE MEDIUM

CROSS-REFERENCE TO RELATED APPLICATION

This patent application is based on and claims priority pursuant to 35 U.S.C. § 119(a) to Japanese Patent Application No. 2020-101957, filed on Jun. 12, 2020, in the Japan Patent Office, the entire disclosure of which is hereby incorporated by reference herein.

BACKGROUND

Technical Field

Embodiments of the present disclosure relate to a resource management apparatus, a resource management system, and a non-transitory computer-executable medium.

Related Art

A technique in which an information processing terminal provided in a meeting room displays information relating to reservation of resources such as the meeting room is known. This technique allows a user to input the start of use of a meeting room to the information processing terminal when the user is going to start using the meeting room, and to input the end of use when the user is going to finish using the meeting room.

SUMMARY

According to an embodiment, a resource management apparatus is communicable with a communication terminal that displays usage states of a plurality of resources. The resource management apparatus includes circuitry configured to transmit a request for reservation information indicating reservation contents of the plurality of resources to a reservation management apparatus that manages reservations of the plurality of resources, receive the reservation information relating to the plurality of resources transmitted by the reservation management apparatus, and transmit, to the communication terminal, image information of the plurality of resources, location information indicating locations of the plurality of resources, and usage states of the plurality of resources, and the received reservation information relating to the plurality of resources, the image information, the location information, and the usage states being managed by the resource management apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a conceptual diagram illustrating an example of a reservation information management table, according to the first embodiment of the present disclosure;

FIG. 6A is a conceptual diagram illustrating an example of a login information table, according to the first embodiment of the present disclosure;

FIG. 6B is a conceptual diagram illustrating an example of a resource state management table, according to the first embodiment of the present disclosure;

FIG. 6C is a conceptual diagram illustrating an example of a resource identification management table, according to the first embodiment of the present disclosure;

FIG. 7 is a conceptual diagram illustrating an example of a resource group management table, according to the first embodiment of the present disclosure;

FIG. 8A is a conceptual diagram illustrating an example of an each-resource reservation management table, according to the first embodiment of the present disclosure;

FIG. 8B is a conceptual diagram illustrating an example of a map information management table, according to the first embodiment of the present disclosure;

FIG. 9 is a conceptual diagram illustrating an example of a mark management table, according to the first embodiment of the present disclosure;

Figure 1:
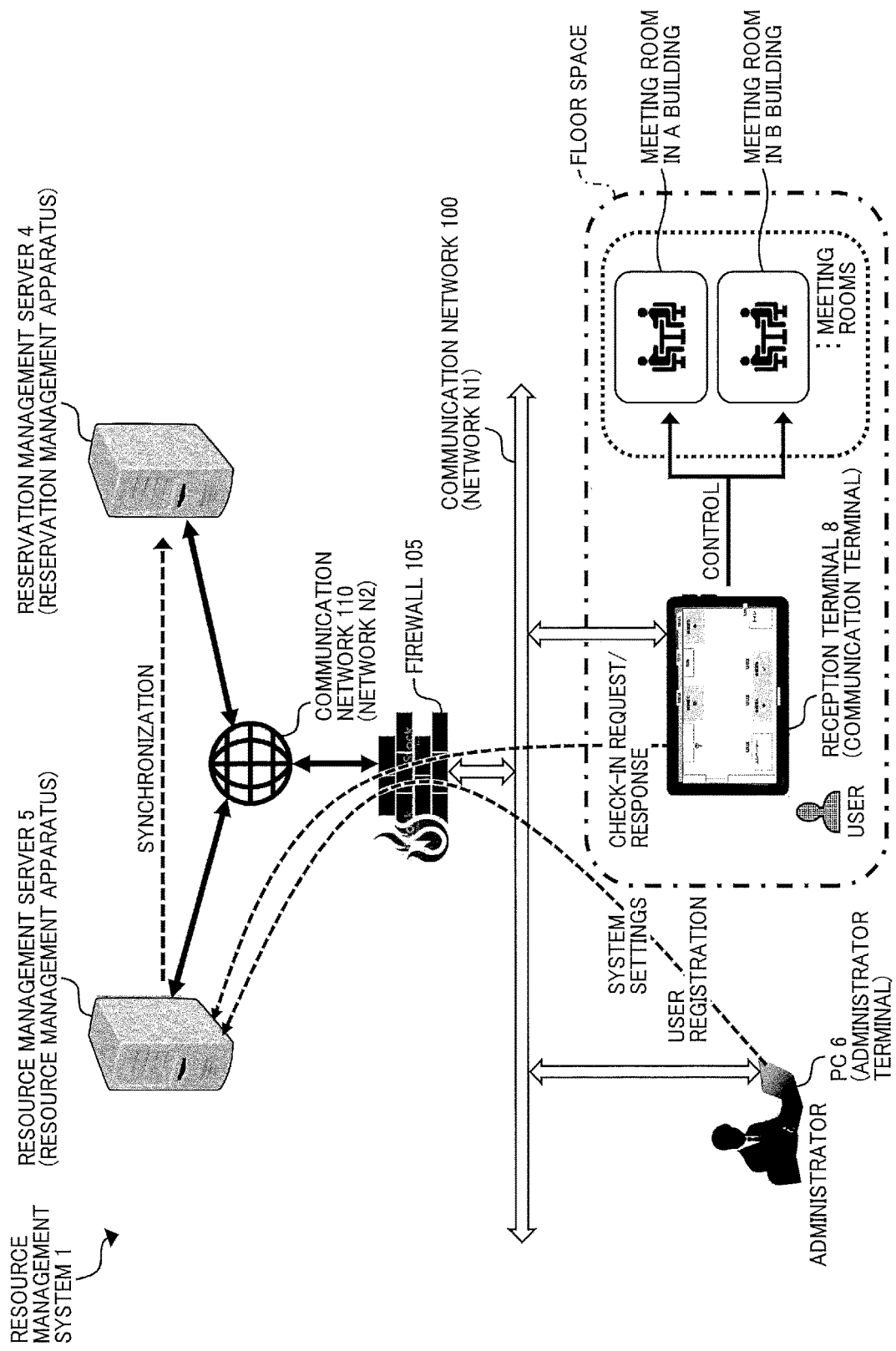
FIG. 1 is a schematic view illustrating an example of an overall configuration of a resource management system, according to the first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure are described with reference to the drawings. In the description of the drawings, the same elements are denoted by the same reference numerals, and redundant descriptions thereof are omitted.

First Embodiment

A description is given below of a first embodiment of the present disclosure, with reference to FIG. 1 to FIG. 20.

Overview of Resource Management System:

FIG. 1 is a schematic view illustrating an example of a configuration of a resource management system 1, according to the first embodiment. In the resource management system 1 illustrated in FIG. 1, a floor map of resources is uploaded from a personal computer (PC) 6 used by an administrator of the resources to a resource management server 5, and location information is assigned to the floor map. Further, the resource management server 5 transmits the floor map to which the location information is assigned, a usage state of each resource, and reservation information relating to each resource, to a reception terminal 8, which is provided in a space where the resources are present. With this configuration, the resource management system 1 enables a user who uses the resources to recognize, by viewing information displayed by the reception terminal 8, both a place where a desired resource which the user wants to use is present and what kind of reservation information and usage state the desired resource has. In the present embodiment, the term "administrator" refers to, for example, a system administrator of a system division that manages meeting rooms or the like among customers such as companies that use the resource management system 1.

Example of System Configuration:

The resource management system 1 includes a reservation management server 4, the resource management server 5, the PC 6, and the reception terminal 8. The PC 6 and the reception terminal 8 are connected to each other inside a firewall 105 through a communication network 100 (network N1) such as an intra-company network. The reservation management server 4 and the resource management server 5 are connected to the outside of the firewall 105 so as to communicate through a communication network 110 (network N2). The communication network 110 is a network through which an unspecified number of communications are established, and is implemented by the Internet, a mobile communication network, or a local area network (LAN), for example. The communication network 110 may include, in addition to a wired communication, a wireless communication in compliance with, for example, 3rd Generation (3G), 4th Generation (4G), 5th Generation (5G), Worldwide Interoperability for Microwave Access (WiMAX), and Long Term Evolution (LTE).

Reservation Management Server:

The reservation management server 4 is implemented by one or more information processing apparatuses (a computer system), each being installed with a general-purpose server operating system (OS), for example. A system related to managing with the reservation management server 4 including managing a reservation for a resource and managing a reservation or a schedule made by a user is referred to as a reservation management system. The reservation management server 4 includes a calendar system and provides a web application for managing various schedules of a user. For example, the reservation management server 4 has following functions:

Accepting a registration of a reservation or a schedule from a user and enabling the user to check the reservation or the schedule from anywhere at any time;

Transmitting a reminder email at a preset date and time, such as 30 minutes before a scheduled time;

Enabling the user to manage reservations and schedules by using plural calendars (one for business, another one for family, etc.); and Sharing a calendar with other members who belongs to the same group. The reservation management server 4 uses accounts to manage the users. The account represents a right of a corresponding user to use a service. The account is used in many systems and a user of each system uses his or her account to log in the system. For this reason, an account has a function (function of identification information) to enable the system to uniquely identify a corresponding user. In the present embodiment, the reservation management server 4 transmits reservation information associated with an account (domain) registered in advance to a meeting management server (conference management server) that manages meeting rooms or the like. Alternatively, the meeting management server requests the reservation information by designating the account of the reservation management server 4, to acquire the reservation information associated with a meeting room (conference room) from the reservation management server 4. The account may be any suitable information that uniquely identifies a user. Examples of the account include an email address, an identifier (ID), and a telephone number.

In the present embodiment, the reservation management server 4 manages information on reservations for various types of resources, which includes a free space and a meeting room, and information on scheduled events or user schedules. Although G Suite (registered trademark), Office 365 (registered trademark), and the like are known as the reservation management system, any other suitable reservation management system having functions described in the present embodiment will suffice.

Further, in the present embodiment, the reservation management server 4 registers information on various types of resources reserved by each of the users and information on the schedule of each of the users in advance. In other words, the web application of the reservation management server 4 is customized according to a meeting room name, a meeting room ID, a reservation available time, a capacity, a reservation unit, and the like of each meeting room residing within the intra-company network of a company using the resource management system 1. Accordingly, the resources including each meeting room of the company using the resource management system 1 is associated with the reservation information. In the present embodiment, the reservation management server 4 functions as an example of a reservation management apparatus.

Resource Management Server:

The resource management server 5 is implemented by one or more information processing apparatuses (a computer system), each being installed with a general-purpose server OS, for example. As processing related to the communication network 110 (network N2), the resource management server 5 acquires the reservation information associated with each meeting room and information on expected participants set in the reservation information from the reservation management server 4 and transmits a notification, at a preset time, to the expected participants and to a related chat server group (or an individual user such as a user who makes the reservation). The user who makes a reservation may be referred to as a "reservation-making user" hereinafter. Further, as processing related to the communication network 100 (network N1), the resource management server 5 manages check-in and check-out with respect to each meeting room, and/or controls a power supply of an electronic device that is provided in each meeting room, based on the reservation information, which is corresponding to the meeting room, acquired from the reservation management server 4. In the present embodiment, the resource management server 5 functions as an example of a resource management apparatus.

The communication network 100 includes, for example, each meeting room in a floor space, a workplace for the expected participants, and a workplace for the administrator, and the communication network 110 is accessible by the expected participants via the communication network 100 and the firewall 105. Examples of the communication network 100 include, but are not limited to, a LAN. However, each meeting room, the workplace for the expected participants, and the workplace for the administrator are not necessarily in the LAN of the same company.

Further, the information shared by the resource management server 5 is not limited to data representing texts, but includes data also representing such as, for example, images, video images, and sounds. However, in the description of the present embodiment, an example case in which text is mainly used for the notifications, for the sake of explanatory convenience. For example, regarding a chat system in the present embodiment, a function of voice chat may be used in communications between the members in the group. The voice chat can be a one-to-one voice chat or a one-to-N voice chat, where N≥2. In other words, according to the present embodiment, the chat system notifies the information on the reservation of the resource by outputting a voice message, in addition to or in alternative to, displaying text. LINE (registered trademark), Slack (registered trademark), Microsoft Teams (registered trademark) and the like are known as chat systems, but any chat system having a capability of transmitting notification to one or more users from a bot (a program that executes predetermined processes) will suffice.

In substantially the same manner, the resource management server 5 manages users with an account that is different from the account for the reservation management server 4. A meeting management server basically does not need to recognize the account of the resource management server 5. However, the meeting management server can transmit a notification by designating a desired account for the resource management server 5.

PC:

Further, the administrator who manages the schedule of the user can use the PC 6 that is communicable with the communication network 100 inside the firewall 105. The PC 6 is a communication terminal for the administrator to configure various settings related to the resource (e.g., meeting room) through the web page provided by the resource management server 5. One of these settings is initial settings. A terminal apparatus such as a smartphone that the administrator uses may be used for the initial settings. The PC 6 establishes wired or wireless communications. The PC 6 is installed with a chat application in substantially the same manner as the reception terminal 8. Accordingly, the PC 6 is used as a display terminal that allows the user to check a reservation status of the resource such as a meeting room including a free space reserved by the user. The PC 6 may further have a function of communicating by using browser software and displaying a web page.

Alternative to the PC 6, for example, another communication terminal that has a communication capability, such as a tablet terminal, a Personal Digital Assistant (PDA), or a wearable PC, which includes a sunglass type and a wristwatch type, may be used. In other words, the communication terminal to be used may be any terminal capable of executing software such as browser software. In the present embodiment, the PC 6 functions as an example of an administrator terminal, which is a terminal used by the administrator.

Reception Terminal:

The reception terminal 8 is a communication terminal installed with a general-purpose OS, for example. Alternative to the reception terminal 8, for example, another communication terminal that has a communication capability, such as a tablet terminal, a PC, a PDA, or a wearable PC, which includes a sunglass type and a wristwatch type, may be used. In other words, the communication terminal to be used may be any terminal capable of executing software such as browser software.

In one example, dedicated application software (hereinafter referred to as a "chat application") that is available with the resource management server 5 is installed on the reception terminal 8. By operating the reception terminal 8 on which the chat application is installed, the user is able to reserve, for example, a free space, which is an example of a resource in the present embodiment. In the present embodiment, the resource management system 1 may include a conference management server (meeting management server) for operating dedicated application software related to a conference (meeting) (hereinafter referred to as a conference application or a meeting application). The above-mentioned application may be substituted by browser software. In the present embodiment, the reception terminal 8 functions as an example of a communication terminal.

Terms Used in the Disclosure:

The term "resource" refers to any resource owned, rented, or managed by a company, a group, an organization, or the like. The resource of a company, a group, an organization, or the like, includes for example, a meeting room (conference room) and a facility usable in the meeting room, a device, and a worker (reception group). In addition, the resource includes a free space having a free address (hereinafter simply referred to as a "free space"), a desk, a chair, a place such as a booth, a company car, a bicycle, a parking lot, a bicycle parking lot, a teleconferencing system, and a printing service and mechanism. From among the resources, a resource that is difficult to move is referred to as a "facility". In the description of the present embodiment, for the sake of explanatory convenience, the term "meeting room" is used as an example of the resource. In addition, examples of the resources include various types of electronic devices, places such as rental offices and rental studios, rental cycles, rental cars (sharing cars), accommodation facilities such as hotels, facilities such as entertainment venues, and rental spaces such as rental lockers. "Resource usage request" can be any request with a required resource identification information. For example, such the request includes a usage start request and a reservation start request.

Further, the "user" includes a person who has reserved a resource such as a free space or a meeting room and an administrator who manages the resource management system 1 according to the present embodiment. In a case in which a reservation-making user who reserved a certain resource uses the certain resource, the reservation-making user is a user of the certain resource.

Figure 2:
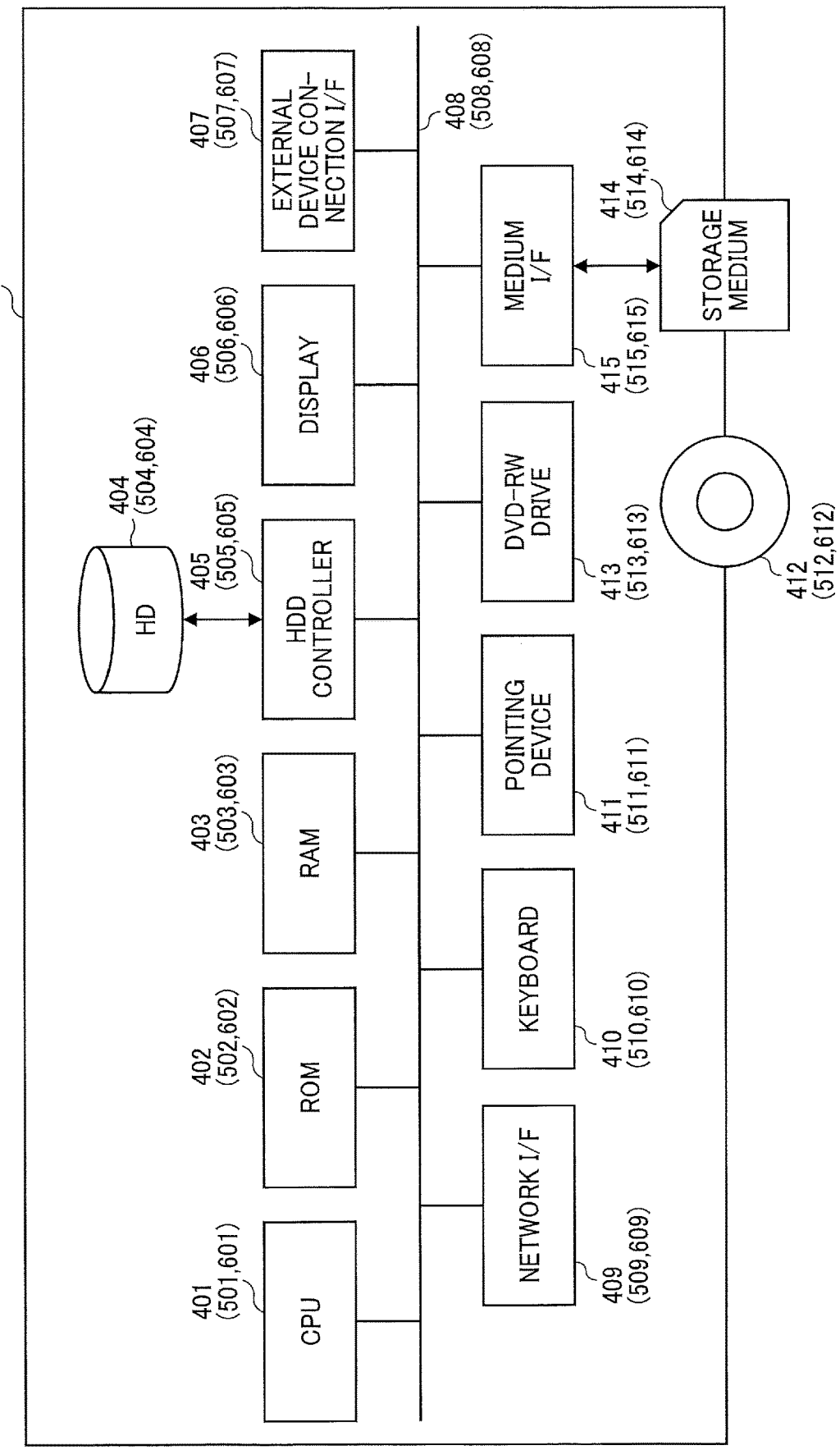
FIG. 2 is a block diagram illustrating an example of a hardware configuration of each of a reservation management server, a resource management server, and a PC, according to the first embodiment of the present disclosure.

Hardware Configuration:

Hardware Configurations of Reservation Management Server, Resource Management Server, and Administrator Terminal:

FIG. 2 is a block diagram illustrating an example of a hardware configuration of each of the reservation management server 4, the resource management server 5, and the PC 6, according to the first embodiment. Each of the reservation management server 4, the resource management server 5, and the PC 6 is implemented by, for example, a computer system having a hardware configuration as illustrated in FIG. 2.

The computer system illustrated in FIG. 2 is implemented by a computer, and includes a central processing unit (CPU) 401, a read-only memory (ROM) 402, a random access memory (RAM) 403, a hard disk (HD) 404, a hard disk drive (HDD) controller 405, a display 406, an external device connection interface (I/F) 407, a bus line 408, a network I/F 409, a keyboard 410, a pointing device 411, a digital versatile disk rewritable (DVD-RW) drive 413, and a medium I/F 415.

The CPU 401 controls entire operation of the computer system. The ROM 402 stores programs including an initial program loader (IPL) to boot the CPU 401. The RAM 403 is used as a work area for the CPU 401. The HD 404 stores various data such as a control program. The HDD controller 405 reads or writes various data from or to the HD 404 under control of the CPU 401. The display 406 displays various information such as a cursor, menu, window, character, or image. The external device connection I/F 407 is an interface that connects the computer system to various external devices. Examples of the external devices include, but are not limited to, a universal serial bus (USB) memory and a printer. The network I/F 409 is an interface that controls communication of data with an external device through the communication network 110. Examples of the bus line 408 include, but are not limited to, an address bus and a data bus, which electrically connects the elements such as the CPU 401 illustrated in FIG. 2 with each other.

The keyboard 410 is an example of an input device provided with a plurality of keys that allow a user to input characters, numerals, or various instructions. The pointing device 411 is an example of an input device that allows a user to select or execute a specific instruction, select a target for processing, or move a cursor being displayed. The DVD-RW drive 413 reads or writes various data from or to a DVD-RW 412, which is an example of a removable storage medium. The removable storage medium is not limited to the DVD-RW and may be a digital versatile disk-recordable (DVD-R) or the like. The medium I/F 415 reads or writes (stores) data from or to a storage medium 414 such as a flash memory.

The resource management server 5 is implemented by a computer, and as illustrated in FIG. 2, includes a CPU 501, a ROM 502, a RAM 503, an HD 504, an HDD controller 505, a display 506, an external device connection I/F 507, a bus line 508, a network I/F 509, a keyboard 510, a pointing device 511, a DVD-RW drive 513, and a medium I/F 515. These elements of the resource management server 5 are substantially the same as the CPU 401, the ROM 402, the RAM 403, the HD 404, the HDD controller 405, the display 406, the external device connection I/F 407, the bus line 408, the network I/F 409, the keyboard 410, the pointing device 411, the DVD-RW drive 413, and the medium I/F 415 of the reservation management server 4. Accordingly, redundant descriptions thereof are omitted, in order to simplify the description.

The PC 6 is implemented by a computer, as described above. As illustrated in FIG. 2, the PC 6 includes a CPU 601, a ROM 602, a RAM 603, an HD 604, an HDD controller 605, a display 606, an external device connection I/F 607, a bus line 608, a network I/F 609, a keyboard 610, a pointing device 611, a DVD-RW drive 613, and a medium I/F 615. These elements of the PC 6 are substantially the same as the CPU 401, the ROM 402, the RAM 403, the HD 404, the HDD controller 405, the display 406, the external device connection I/F 407, the bus line 408, the network I/F 409, the keyboard 410, the pointing device 411, the DVD-RW drive 413, and the medium I/F 415 of the reservation management server 4. Accordingly, redundant descriptions thereof are omitted, in order to simplify the description.

Figure 3:
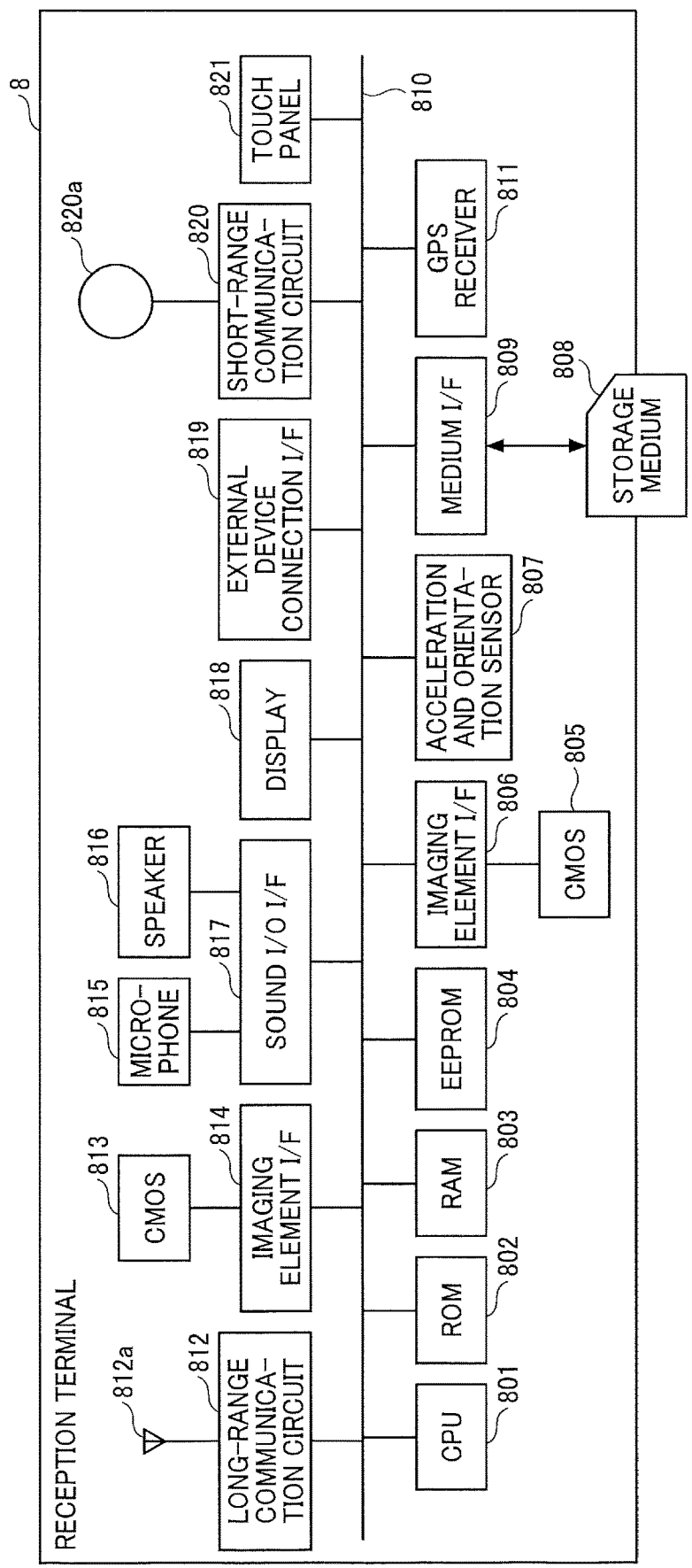
FIG. 3 is a block diagram illustrating an example of a hardware configuration of a reception terminal, according to the first embodiment of the present disclosure.

Hardware Configuration of Reception Terminal 8:

FIG. 3 is a block diagram illustrating an example of a hardware configuration of the reception terminal 8, according to the first embodiment. The reception terminal 8 includes a CPU 801, a ROM 802, a RAM 803, an electrically erasable programmable read-only memory (EEPROM) 804, a complementary metal oxide semiconductor (CMOS) sensor 805, an imaging element I/F 806, an acceleration and orientation sensor 807, a medium I/F 809, and a global positioning system (GPS) receiver 811.

The CPU 801 controls entire operation of the reception terminal 8. The ROM 802 stores programs including an IPL to boot the CPU 801. The RAM 803 is used as a work area for the CPU 801. The EEPROM 804 reads or writes various data such as an application under control of the CPU 801. The CMOS sensor 805 is an example of a built-in imaging element that captures an object under control of the CPU 801 to obtain image data or video data. In alternative to the CMOS sensor 805, an imaging element such as a charge-coupled device (CCD) sensor may be used as an image capturing device. The imaging element I/F 806 is a circuit that controls driving of the CMOS sensor 805. Examples of the acceleration and orientation sensor 807 include, but are not limited to, an electromagnetic compass or gyrocompass for detecting geomagnetism and an acceleration sensor. The medium I/F 809 reads or writes (stores) data from or to a storage medium 808 such as a flash memory. The GPS receiver 811 receives a GPS signal from a GPS satellite.

The reception terminal 8 further includes a long-range communication circuit 812, an antenna 812a for the long-range communication circuit 812, a CMOS sensor 813, an imaging element I/F 814, a microphone 815, a speaker 816, a sound input/output (I/O) I/F 817, a display 818, an external device connection I/F 819, a short-range communication circuit 820, an antenna 820a for the short-range communication circuit 820, and a touch panel 821.

The long-range communication circuit 812 is a circuit that enables the reception terminal 8 to communicate with other device through the communication network 100. The CMOS sensor 813 is an example of a built-in imaging element that captures an object (mainly, a self-image of a user operating the reception terminal 8) under control of the CPU 801 to obtain image data. In alternative to the CMOS sensor, an imaging element such as a charge-coupled device (CCD) sensor can be used. The imaging element I/F 814 is a circuit that controls driving of the CMOS sensor 813. The microphone 815 is a built-in circuit that converts sound into an electric signal. The microphone 815 acquires voice and sound waves emitted from an external speaker, etc., and acquires information using electrical signals. The speaker 816 is a built-in circuit that generates sound such as music or voice by converting an electric signal into physical vibration. The sound I/O I/F 817 is a circuit for inputting or outputting an audio signal between the microphone 815 and the speaker 816 under control of the CPU 801. The display 818 is an example of a display device that displays an image of the object, various icons, etc. Examples of the display 818 include, but are not limited to, a liquid crystal display (LCD) and an organic electroluminescence (EL) display. The external device connection I/F 819 is an interface that connects the reception terminal 8 to various external devices. The short-range communication circuit 820 is a communication circuit that communicates in compliance with the near field communication (NFC), the Bluetooth (registered trademark), and the like. The touch panel 821 is one example of an input device that allows a user to operate the reception terminal 8 by performing a user operation. Examples of the user operation includes, but are not limited to, operations of pressing, clicking, and tapping performed with respect to a screen of the display 818. The imaging device such as the CMOS sensor 813, the short-range communication device such as the short-range communication circuit 820, the voice input device such as the microphone 815, and the like are information acquisition devices that acquire resource identification information by, for example, an image such as an image code, wireless communication, or sound waves.

The reception terminal 8 further includes a bus line 810. Examples of the bus line 810 include, but are not limited to, an address bus and a data bus, which electrically connects elements illustrated in FIG. 3 such as the CPU 801.

Figure 4:
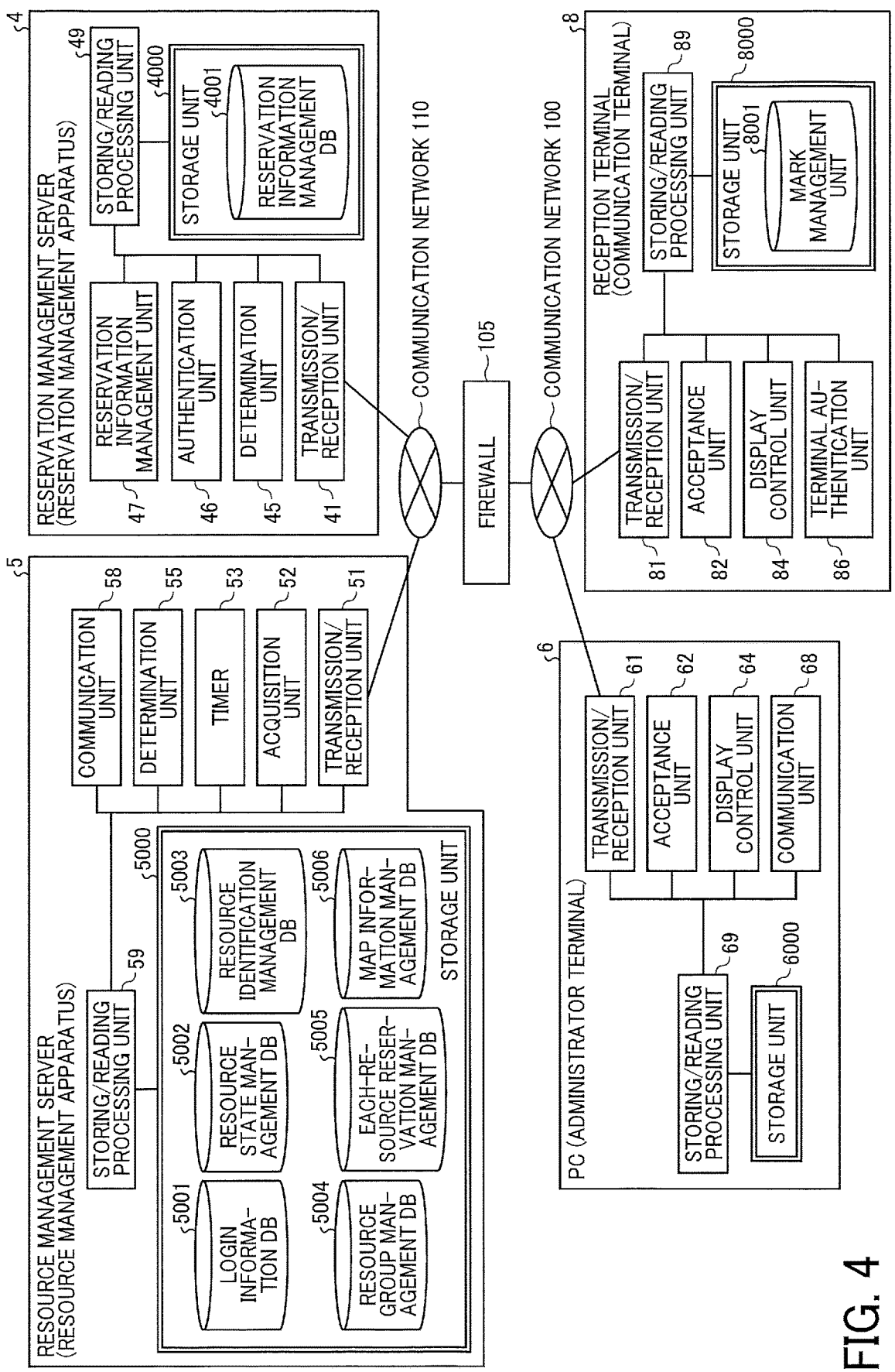
FIG. 4 is a diagram illustrating an example of a functional configuration of the resource management system, according to the first embodiment of the present disclosure.

Functional Configuration of Resource Management System:

A description is now given of a functional configuration of the resource management system 1 according to the present embodiment; with reference to FIG. 4 to FIG. 9. FIG. 4 is a diagram illustrating an example of a functional configuration of the resource management system 1, according to the first embodiment.

Functional Configuration of Reservation Management Server:

As illustrated in FIG. 4, the reservation management server 4 includes a transmission/reception unit 41, a determination unit 45, an authentication unit 46, a reservation information management unit 47, and a storing/reading processing unit 49. These units are functions that are implemented by or that are caused to function by operating any of the hardware elements illustrated in FIG. 2 in cooperation with instructions of the CPU 401 according to the program dedicated to the reservation management server 4 expanded to the RAM 403 from at least one of the ROM 402 and the HD 404.

The reservation management server 4 further includes a storage unit 4000 implemented by the ROM 402 or the HD 404 illustrated in FIG. 2.

Reservation Information Management Table:

FIG. 5 is a conceptual diagram illustrating an example of a reservation information management table, according to the first embodiment. The storage unit 4000 includes a reservation information management database (DB) 4001 that stores the reservation information management table as illustrated in FIG. 5. In the reservation information management table, a resource identifier (ID) indicating resource identification information is used as a tab. In each tab, there are one or more records each corresponding to a reservation ID and having items of the reservation-making user account, start date and time, end date and time, and expected participant account(s), which are associated with each other. An example of the resource ID used as a tab is A101 (meeting room A).

The reservation ID is identification information for identifying one record of the reservation information. ID is an abbreviation for "identification (identifier)" and indicates an identification (identifier) or identification information. ID is any one of a name, a symbol, a character string, a numerical value, or a combination of at least two of these items, which is used for identifying a particular object from among a plurality of objects.

The reservation-making user account indicates an account of the reservation-making user who reserved the resource, and is, for example, an email address indicated by a@ricoh.ex.com. The start date and time is a beginning when a reservation content starts (date and time when the reservation content starts), and the end date and time is an end when the reservation content ends (date and time when the reservation content ends). The expected participant account indicates an account of a person, group, or the like who is expected to participate in an event conducted using the resource reserved by the reservation-making user. The expected participant account is, for example, an email address indicated by b@ricoh.ex.com.

In the present embodiment, the reservation information management table (reservation information management DB 4001) functions as an example of reservation information management means.

Functional Units of Reservation Management Server:

A detailed description is now given of the functional units of the reservation management server 4. The transmission/reception unit 41 of the reservation management server 4 illustrated in FIG. 4 is mainly implemented by processing performed by the CPU 401 illustrated in FIG. 3, the external device connection I/F 407 and the network I/F 409 illustrated in FIG. 2. The transmission/reception unit 41 transmits and receives various data or various information to and from the resource management server 5 via the communication network 110, which resides outside of the firewall 105. Further, the transmission/reception unit 41 receives, from the reception terminal 8, a login authentication request or settings for a reservation for using a free address.

The determination unit 45, which is mainly implemented by processing performed by the CPU 401 illustrated in FIG. 2, performs various determinations in the reservation management server 4.

The authentication unit 46, which is mainly implemented by processing performed by the CPU 401 illustrated in FIG. 2, authenticates a user based on authentication information (e.g., a user ID and password) stored in an authentication information DB. In another example, an integrated circuit (IC) card or biometric authentication information is used for the authentication.

The reservation information management unit 47, which is mainly implemented by processing performed by the CPU 401 illustrated in FIG. 2, manages the reservation information registered by the user. The reservation information management unit 47 reads various reservation information from the reservation information management DB 4001 described above and transmits the various reservation information to the resource management server 5 via the transmission/reception unit 41.

The storing/reading processing unit 49, which is mainly implemented by processing performed by the CPU 401 illustrated in FIG. 2, stores various data (or information) in the storage unit 4000 or reads various data (or information) from the storage unit 4000.

Functional Configuration of Resource Management Server:

As illustrated in FIG. 4, the resource management server 5 includes a transmission/reception unit 51, an acquisition unit 52, a timer 53, a determination unit 55, a communication unit 58, and a storing/reading processing unit 59. These units are functions that are implemented by or that are caused to function by operating any of the hardware elements illustrated in FIG. 2 in cooperation with instructions of the CPU 501 according to the program dedicated to the resource management server 5 expanded to the RAM 503 from at least one of the ROM 502 and the HD 504. The resource management server 5 further includes a storage unit 5000 implemented by the ROM 502 or the HD 504 illustrated in FIG. 2.

Login Information Table:

FIG. 6A is a conceptual diagram illustrating an example of a login information table, according to the first embodiment. The storage unit 5000 includes a login information DB 5001 that stores the login information table as illustrated in FIG. 6A. The login information table stores and manages, for each customer ID, a user ID, a login password, and a server uniform resource locator (URL) in association with each other. The customer ID is identification information associated with a customer such as a company.

As the user ID, for example, an email address corresponding to a user, who is managed by using a corresponding customer ID, is stored and managed. For example, when an authentication requested from a user to the resource management server 5 is successful, the resource management server 5 determines that an entered user ID is valid. This user ID indicates the same account as the account of a user who reserves a resource or a participant who participates in various events conducted in or using the resource. Accordingly, the resource management server 5 can identify particular reservation information that includes the user who enters the user ID as a reservation-making user or a participant, based on the entered user ID. In the present embodiment, the user ID is used as an example of user identification information.

The login password is identification information associated with the user ID that is used for login to use the resource management system 1. The login password is set by the user at the time of first startup (first login), for example. The server URL is a URL assigned to the customer in the resource management server 5. The same server URL may be assigned to a plurality of customers.

In the present embodiment, the login information table (login information DB 5001) functions as an example of login information management means.

Resource State Management Table:

FIG. 6B is a conceptual diagram illustrating an example of a resource state management table, according to the first embodiment. The storage unit 5000 includes a resource state management DB 5002 that stores the resource state management table as illustrated in FIG. 6B. The resource state management table stores and manages, for each resource ID, a reservation-making user account, an event name, a resource ID, a start date and time, an end date and time, an expected participant account, and a usage state of a resource in association with each other.

The reservation ID is identification information for identifying one record of the reservation information. The same applies to other IDs than the reservation ID. The reservation-making user account is an account of an expected participant who made a reservation for each meeting room in a floor space, which a control target by the resource management system 1, for example. The reservation-making user account is an account of a reservation-making user (expected participant) who reserved each meeting room in the floor space. The event name is a name of an event such as a meeting. The event name is given by an expected participant at his or her choice. The resource ID is identification information that identifies a resource such as a meeting room in the company network. The expected participant account is an account of an expected participant, who is to attend the meeting. Each of the reservation-making user account and the expected participant account of FIG. 6 is issued by the reservation management server 4.

The usage state of the resource indicates a current state of the target resource. In a case in which the resource is a space such as the meeting room, the usage state includes "in use" and "waiting for entry", for example. The usage state of the resource may be associated with the reservation status. For example, each status related to the resource reservation, such as "notification sent, "reservation confirmed", "waiting for check-in", "checked-in", "checked-out", or "cancelled (cancellation)" may be registered. The usage state may be changed according to a current time with respect to the start date and time and the end date and time, or a predetermined user operation (check-in operation, etc.) by the user.

In the present embodiment, the resource state management table (resource state management DB 5002) functions as an example of resource state management means.

Resource Identification Management Table:

FIG. 6C is a conceptual diagram illustrating an example of a resource identification management table, according to the first embodiment. The storage unit 5000 includes a resource identification management DB 5003 that stores the resource identification management table as illustrated in FIG. 6C. The resource identification management table stores and manages, for each reservation ID, the resource ID, and an event ID in association with each other.

The event ID is information required for a check-in to the resource, such as a meeting room where the corresponding event is to be held. As the event identification ID, texts, a series of number, which is multiple digits, which are uniquely assigned, or a combination of such texts and such numbers may be used. The check-in means to start using the corresponding resource.

In the present embodiment, the resource identification management table (resource identification management DB 5003) functions as an example of resource identification management means.

Resource Group Management Table:

FIG. 7 is a conceptual diagram illustrating an example of a resource group management table, according to the first embodiment. The storage unit 5000 includes a resource group management DB 5004 that stores the resource group management table as illustrated in FIG. 7. The resource group management table stores and manages, for each customer ID, a resource name, a resource ID, a resource state, an authentication key, a management start flag, a resource group, an operation rule, a group ID and group name in association with each other.

The resource name is a general-purpose name of a meeting room recognized by participants participating in an event (e.g., a meeting). Examples of the resource name include, but are not limited to, a name that is presented at the entrance of the meeting room.

The resource ID is identification information for uniquely identifying a meeting room, as described above. In one example, the resource ID is common to that stored in the reservation management server 4, to simplify the configuration and operation. In another example, a conversion table is provided that allows the administrator to set the different resource ID from that stored in the reservation management server 4.

The resource state indicates whether the configuration of initial settings of a terminal located in each meeting room or the reception terminal 8 has been completed, whether communication is available, and the like. Examples of the resource state are as follows. "Connected" as the resource state indicates a state in which communication is confirmed within a certain time period. "Before setup" in the resource state indicates a state in which the initial settings have not been configured yet. "Disconnected" in the resource state indicates a state in which no communication has been performed for equal to or longer than a certain time period.

The authentication key is authentication information used by the resource management server 5 to authenticate the terminal located in each meeting room or the reception terminal 8. The authentication key is set to the terminal located in each meeting room or the reception terminal 8 by the initial settings. The authentication key is a combination of numbers, alphabets, symbols, and the like that are too long to be identified by brute force attack. In another example, the authentication key may be determined by either the resource management server 5 or the administrator.

The management start flag is, for example, a flag indicating whether the resource management server 5 starts managing the meeting room after the initial settings of the terminal located in each meeting room or the reception terminal 8 has been configured. The value "true" set in the management start flag indicates that the resource management server 5 starts managing the meeting room. The value "false" set in the management start flag indicates that the resource management server 5 does not start managing the meeting room. The management start flag substantially eliminates inconveniences, such as automatic cancellation of reservation, caused by a time lag between the time when the configuration of the initial settings is completed and the time when the terminal is arranged in each meeting room.

The resource group is, for example, an administratively assigned group of meeting rooms and indicates a difference of a business site or a building in which the meeting room is located.

The operation rule indicates which rule regarding the operation of the resource is applied, such as a time when check-in becomes available, an automatic cancellation time, or the necessity of automatic startup of an electronic device. For example, "Default" indicates a rule for employees, "Guest" indicates a rules for visitors, and "Executive" indicates a rule for executives.

In the group ID, identification information of a group to which a plurality of resources grouped by the administrator belong is set. For example, the table of FIG. 7 indicates that the resources (meeting rooms) identified by the resource IDs B101 and B102 are grouped into G002. For a resource (meeting room) that does not belong to any group, no value is set in the item of the group ID.

In the group name, a group name entered by the administrator is set. In substantially the same manner as the group ID, no value is set in the item of the group name for a resource (meeting room) that does not belong to any group.

Of the above-mentioned items, values transmitted from the reservation management server 4 may be set in the resource name, the resource ID, the management start flag, the resource group, and the operation group. In this case, the initial value of the management start flag is False. Alternatively, the administrator can set values in the items to the resource management server 5. The default value (the value immediately after setting by a provider) of the state of the resource is "before setup". However, the value automatically transitions according to the communication state. The value of the authentication key is assigned and set by the resource management server 5 at the time of initial settings, for example. The management start flag is set by the administrator. The value of the item of the group ID is set by the resource management server 5 at the time when the administrator performs grouping. The value of the item of the group name item is set by the administrator. In the present embodiment, the resource group management table (resource group management DB 5004) functions as an example of resource group management means.

Each-Resource Reservation Management Table:

FIG. 8A is a conceptual diagram illustrating an example of an each-resource reservation management table, according to the first embodiment. The storage unit 5000 stores an each-resource reservation management DB 5005 including the each-resource reservation management table as illustrated in FIG. 8A. In the each-resource reservation management table, the resource is used as a tab. In each tab, there are one or more records each being corresponding to a reservation ID and having items of the reservation-making user account, start date and time, end date and time, expected participant account(s), and resource state, which are associated with each other. The resource state indicates the state of a resource (e.g., a meeting room). Examples of the resource state include, but are not limited to "in use (checked-in)" and "waiting for entry (notification sent)".

In the present embodiment, the each-resource reservation management table (each-resource reservation management DB 5005) functions as an example of each-resource reservation management means.

Map Information Management Table FIG. 8B is a conceptual diagram illustrating an example of a map information management table, according to the first embodiment. The storage unit 5000 includes a map information management DB 5006 that stores the map information management table as illustrated in FIG. 8B. In the map information management table, the customer ID is used as a tap. In each tab, there are one or more records each being corresponding to a group ID and having items of the resource ID, a map image file (URL), a coordinate (x), and a coordinate (y), which are associated with each other.

The map image file is indicated by an URL of a browser and implemented by image data in a file format such as a jpg file. Further, the coordinate (x) and the coordinate (y) represent a distance from an origin O in an X-Y coordinate system representing a horizontal direction (X-axis) and a vertical direction (Y-axis) of the map image file. For example, pixel ([px]) is used as a unit of distance. In other words, the map image file is implemented by information including image information indicating each resource and location information indicating the location of each resource. Thereby, the map image is an image in which the image of each resource and the location of each resource are associated with each other. In the present embodiment, the map information management table (map information management DB 5006) functions as an example of map information management means.

Functional Units of Resource Management Server:

A detailed description is now given of the functional units of the resource management server 5. The transmission/reception unit 51 of the resource management server 5 illustrated in FIG. 4 is mainly implemented by processing of the CPU 501 illustrated in FIG. 2, the external device connection I/F 507 and the network I/F 509, which are also illustrated in FIG. 2. The transmission/reception unit 51 transmits and receives various data to and from the reservation management server 4.

The acquisition unit 52, which is mainly implemented by processing of the CPU 501 illustrated in FIG. 2, registers the authentication information (user ID and password, administrator ID and password) transmitted from the reception terminal 8 and the PC 6 to the login information table that is included in the login information DB 5001.

The timer 53, which is mainly implemented by processing of the CPU 501 illustrated in FIG. 2, manages time information in the resource management server 5.

The determination unit 55, which is mainly implemented by processing of the CPU 501 illustrated in FIG. 2, makes various determinations in the resource management server 5.

The communication unit 58 is mainly implemented by processing of the CPU 501 illustrated in FIG. 2, the external device connection I/F 507 and the network I/F 509, which are also illustrated in FIG. 2. The communication unit 58 mainly communicates with the reservation management server 4 and other devices.

The storing/reading processing unit 59, which is mainly implemented by processing of the CPU 501 illustrated in FIG. 2, stores various data (or information) in the storage unit 5000 or reads various data (or information) from the storage unit 5000.

Functional Configuration of PC:

As illustrated in FIG. 4, the PC 6 includes a transmission/reception unit 61, an acceptance unit 62, a display control unit 64, a communication unit 68, and a storing/reading processing unit 69. These units are functions that are implemented by or that are caused to function by operating any of the hardware elements illustrated in FIG. 2 in cooperation with instructions of the CPU 601 according to the program dedicated to the PC 6 expanded to the RAM 603 from at least one of the ROM 602 and the HD 604. The PC 6 further includes a storage unit 6000 implemented by the ROM 602 or HD 604 illustrated in FIG. 2.

Functional Units of PC:

A detailed description is now given of the functional units of the PC 6. The transmission/reception unit 61 of the PC 6 illustrated in FIG. 4 is mainly implemented by processing of the CPU 601 illustrated in FIG. 2, the external device connection I/F 607 and the network I/F 609, which are also illustrated in FIG. 2. The transmission/reception unit 61 transmits and receives various data to and from the resource management server 5 through the communication network 100. In the present embodiment, the transmission/reception unit 61 transmits and receives to and from the resource management server 5 various information (data) including information on a reservation for each resource, information on a resource reservation status associated with a user who uses the resource, information on schedules associated with a user who uses the resource.

The acceptance unit 62, which is mainly implemented by processing of the CPU 601, the keyboard 610, and the pointing device 611 illustrated in FIG. 2, receives various selections or inputs performed by the administrator. In addition to or in alternative to the keyboard 610 and the pointing device 611, any suitable input devices such as a touch panel may be used.

The display control unit 64, which is mainly implemented by processing of the CPU 601 and the display 606 illustrated in FIG. 2, displays, for example, texts and images represented by various data transmitted from the resource management server 5.

The communication unit 68 is mainly implemented by processing of the CPU 601 illustrated in FIG. 2, the external device connection I/F 607 and the network IN 609, which are also illustrated in FIG. 2. The communication unit 68 communicates with terminals including the reception terminal 8 and various types of devices via the communication network 100 that resides inside the firewall 105. In the above description, the communication unit 68 and the transmission/reception unit 61 individually have a communication unit. In another example, the communication unit 68 and the transmission/reception unit 61 share a single communication unit.

The storing/reading processing unit 69, which is mainly implemented by processing of the CPU 601 illustrated in FIG. 2, stores various data in the storage unit 6000 or reads various data from the storage unit 6000.

Functional Configuration of Reception Terminal:

As illustrated in FIG. 4, the reception terminal 8 includes a transmission/reception unit 81, an acceptance unit 82, a display control unit 84, a terminal authentication unit 86, and a storing/reading processing unit 89. These units are functions that are implemented by or that are caused to function by operating any of the hardware elements illustrated in FIG. 3 in cooperation with instructions of the CPU 801 according to the program dedicated to the reception terminal 8 expanded to the RAM 803 from at least one of the ROM 802 and the EEPROM 804.

The reception terminal 8 further includes a storage unit 8000 implemented by the ROM 802 or the EEPROM 804 illustrated in FIG. 3.

Mark Management Table:

FIG. 9 is a conceptual diagram illustrating an example of a mark management table, according to the first embodiment. The storage unit 8000 includes a mark management DB 8001 that stores the mark management table as illustrated in FIG. 9. The mark management table stores and manages, for each resource state, a resource state and a mark in association with each other.

Examples of the resource state include, but are not limited to, "vacant", "in use", "waiting for entry", and "current location". The "current location" is managed as an item indicating a location where the reception terminal 8 is provided. Examples of the mark includes, but are not limited to, "♦", "check mark", "●", and "current location symbol". The resource state can be in various forms depending on the type of a target resource. For example, when the target resource is a shared vehicle such as a rental car, examples of the resource state include, but are not limited to, "rental", "available", "maintenance in process", "filling up". In the present embodiment, the mark management table (mark management DB 8001) functions as an example of mark management means.

Functional Units of Reception Terminal:

A detailed description is now given of the functional units of the reception terminal 8. The transmission/reception unit 81 of the reception terminal 8 illustrated in FIG. 4 is mainly implemented by processing of the CPU 801 illustrated in FIG. 3, the long-range communication circuit 812, and the external device connection IT 819, which are also illustrated in FIG. 3. The transmission/reception unit 81 transmits and receives various data or various information to and from the reservation management server 4 and the resource management server 5 through the communication network 100.

The acceptance unit 82, which is mainly implemented by processing of the CPU 801 and processing of the touch panel 821 illustrated in FIG. 3, receives various selections or inputs performed by the user. In addition to or in alternative to the touch panel 821, any suitable input devices such as an operation key may be used.

The display control unit 84, which is mainly implemented by processing of the CPU 801 and the display 818 illustrated in FIG. 3, controls the display 818 to display various images, characters, code information, or the like.

The terminal authentication unit 86, which is mainly implemented by processing of the CPU 801 illustrated in FIG. 3, authenticates a login to a terminal application based on whether the entered password is correct or not, for example.

The storing/reading processing unit 89, which is mainly implemented by processing of the CPU 801 illustrated in FIG. 3, stores various data (or information) in the storage unit 8000 or reads various data (or information) from the storage unit 8000.

Processes or Operation of Embodiment:

A description is now given of processes or operation performed by the resource management system 1 according to the present embodiment, with reference to FIG. 10 to FIG. 20.

Figure 10:
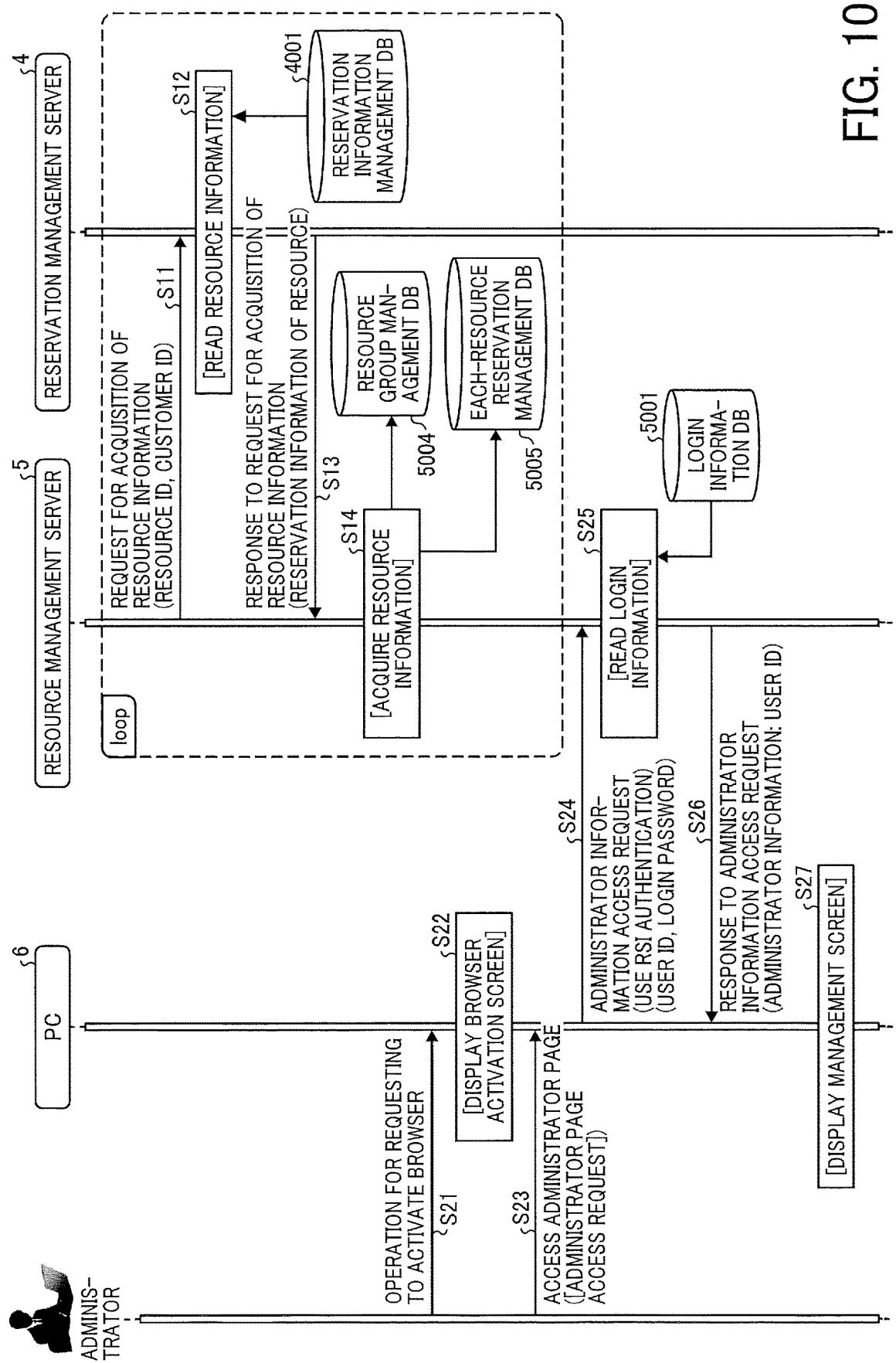
FIG. 10 is a sequence diagram illustrating an example of an activation operation in a link registration of a meeting room map, according to the first embodiment of the present disclosure.

Operation of Link Registration of Meeting Room Map:

First, a description is given of an operation of registering a meeting room map, with reference to FIG. 10. FIG. 10 is a sequence diagram illustrating an example of an activation operation in the link registration of the meeting room map, according to the first embodiment.

Acquisition of Meeting Room Information:

First, the transmission/reception unit 51 of the resource management server 5 transmits a resource information acquisition request that includes a resource ID and a customer ID to the reservation management server 4 (step S11). Thereby, the transmission/reception unit 41 of the reservation management server 4 receives the resource information acquisition request, which includes the resource ID and the customer ID, transmitted by the resource management server 5. In the present embodiment, the transmission/reception unit 51 functions as an example of transmission means.

Next, the storing/reading processing unit 49 of the reservation management server 4 searches the reservation information management table (see FIG. 5) using the resource ID received by the transmission/reception unit 41 as a search key to read the reservation information associated with the corresponding meeting room (step S12). Further, the storing/reading processing unit 49 searches a data table stored and managed in the reservation management server 4 using the customer ID as a search key to read the corresponding information.

Next, the transmission/reception unit 41 transmits the reservation information of the resource to the resource management server 5 as a response of the resource information acquisition request (step S13). Thereby, the transmission/reception unit 51 of the resource management server 5 receives the reservation information of the resource transmitted by the transmission/reception unit 41 of the reservation management server 4. The reservation information of the resource includes, for example, a reservation-making user account, a start date and time and an end date and time of an event conducted in a meeting room as the resource, expected participant accounts. In the present embodiment, the transmission/reception unit 51 functions as an example of reception means.

Next, the storing/reading processing unit 59 of the resource management server 5 registers the reservation information received by the transmission/reception unit 51 to the resource group management table included in the resource group management DB 5004 and the each-resource reservation management table included in the each-resource reservation management DB 5005. (step S14). Thereby, the acquired information related to each meeting room is registered and managed in the resource group management DB 5004 and the each-resource reservation management DB 5005. Since the information on the meeting room does not change frequently, the time interval for the acquisition may be at a low frequency such as once per day. In another example, the acquisition unit 52 acquires the reservation information from the reservation management server 4 periodically or when the reservation information is updated.

In the resource management system 1 according to the present embodiment, when the processes of steps S11 and S13 described above are performed, an intervening apparatus or the like may be provided between the resource management server 5 (resource management apparatus) and the reservation management server 4 (reservation management apparatus). In other words, the resource management system 1 may have a configuration in which the information transmitted or received between the resource management server 5 and the reservation management server 4 is transmitted or received via another apparatus. The above-described configuration and processing may also be applied in the subsequent processes.

Figure 13:
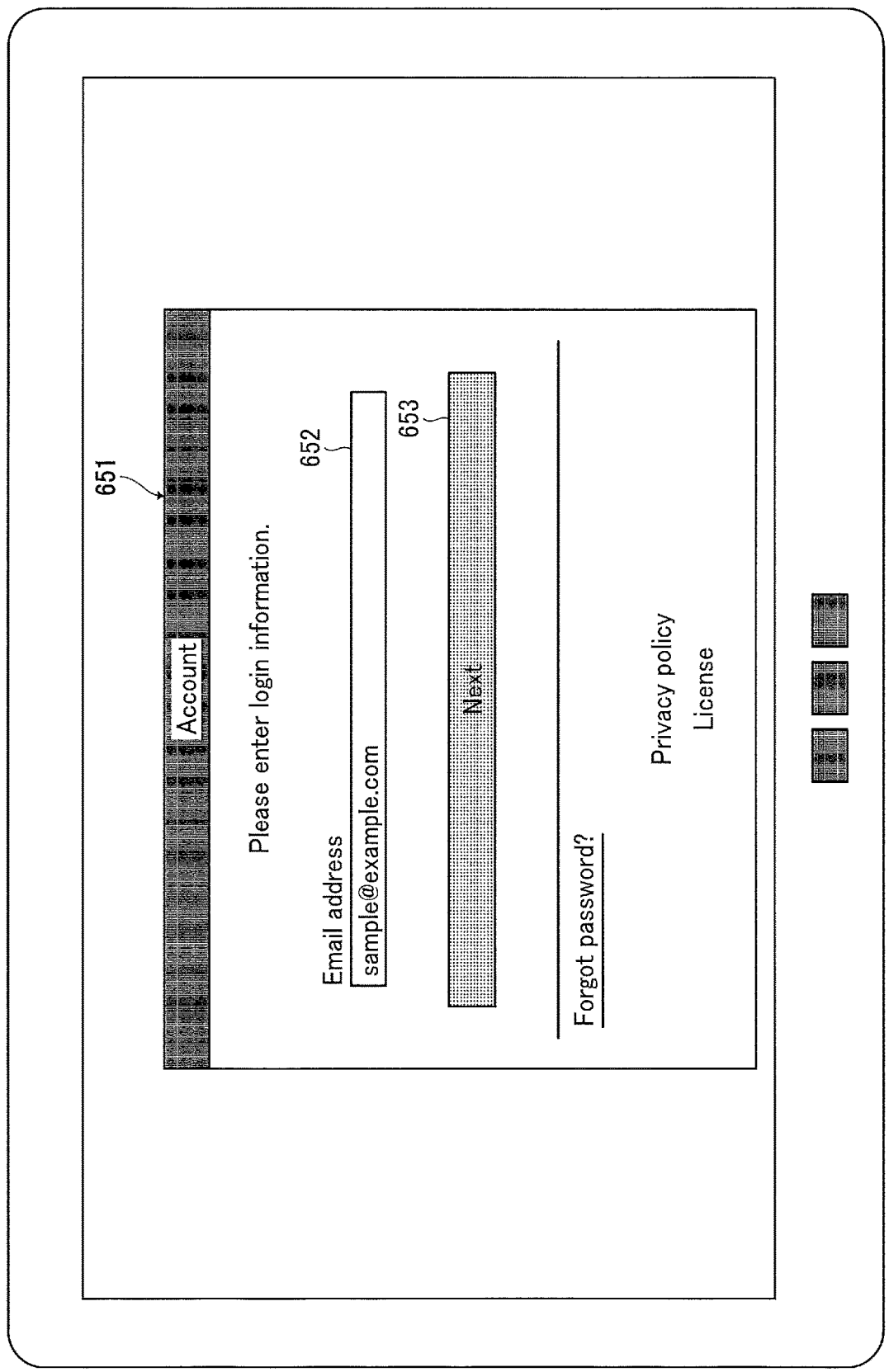
FIG. 13 is a diagram illustrating an example of a login screen in activation, according to the first embodiment of the present disclosure.

Activation Process of Browser:

Next, the acceptance unit 62 of the PC 6 receives a request to activate a browser according to an operation input by the administrator (step S21). The administrator who is going to configure initial settings of the reception terminal 8 starts, for example, a browser of the PC 6 and performs an operation for logging in to the resource management server 5. In another example, the administrator starts a dedicated application, instead of the browser. As authentication information, a user ID and a password are used, for example. In the following, a description is given on the assumption that the authentication is successful. Thereby, the PC 6 displays an initial screen. As an example of the example, FIG. 13 illustrates an example of a login screen.

In response to receiving the input of the authentication information, the display control unit 64 controls the display 606 of the PC 6 to display a browser activation screen (e.g., a login screen 651) (step S22).

The administrator views the browser activation screen in step S22 and performs an operation of inputting a request for accessing an administrator page (administrator page access request). Thereby, the acceptance unit 62 of the PC 6 receives the access request input by the administrator (step S23).

In response to receiving the access request in step S23, the transmission/reception unit 61 transmits, to the resource management server 5, an administrator information access request by using a general-purpose personal authentication system, for example (step S24). Thereby, the transmission/reception unit 51 of the resource management server 5 receives the administrator information access request transmitted from the PC 6. The administrator information access request includes an administrator user ID (e.g., an email address) and a login password.

Next, the storing/reading processing unit 59 of the resource management server 5 performs a login information read process. Specifically, the storing/reading processing unit 59 searches the login information table (see FIG. 6A) using the received user ID or login password as a search key as the login information reading process, to read the corresponding user ID and login password (step S25). In the present embodiment, the storing/reading processing unit 59 functions as an example of storing/reading means.

In a case in which the user authentication is successful, the transmission/reception unit 51 transmits an administrator information access response including the user ID of the administrator to the PC 6 (step S26). Thereby, the transmission/reception unit 61 of the PC 6 receives the administrator information access response including the user ID of the administrator transmitted from the resource management server 5.

In the resource management system 1 according to the present embodiment, when the processes of steps S24 and S26 described above are performed, an intervening apparatus or the like may be provided between the resource management server 5 (resource management apparatus) and the PC 6 (administrator terminal). In other words, the resource management system 1 may have a configuration in which the information transmitted or received between the resource management server 5 and the PC 6 is transmitted or received via another apparatus. The above-described configuration and processing may also be applied in the subsequent processes.

Figure 14:
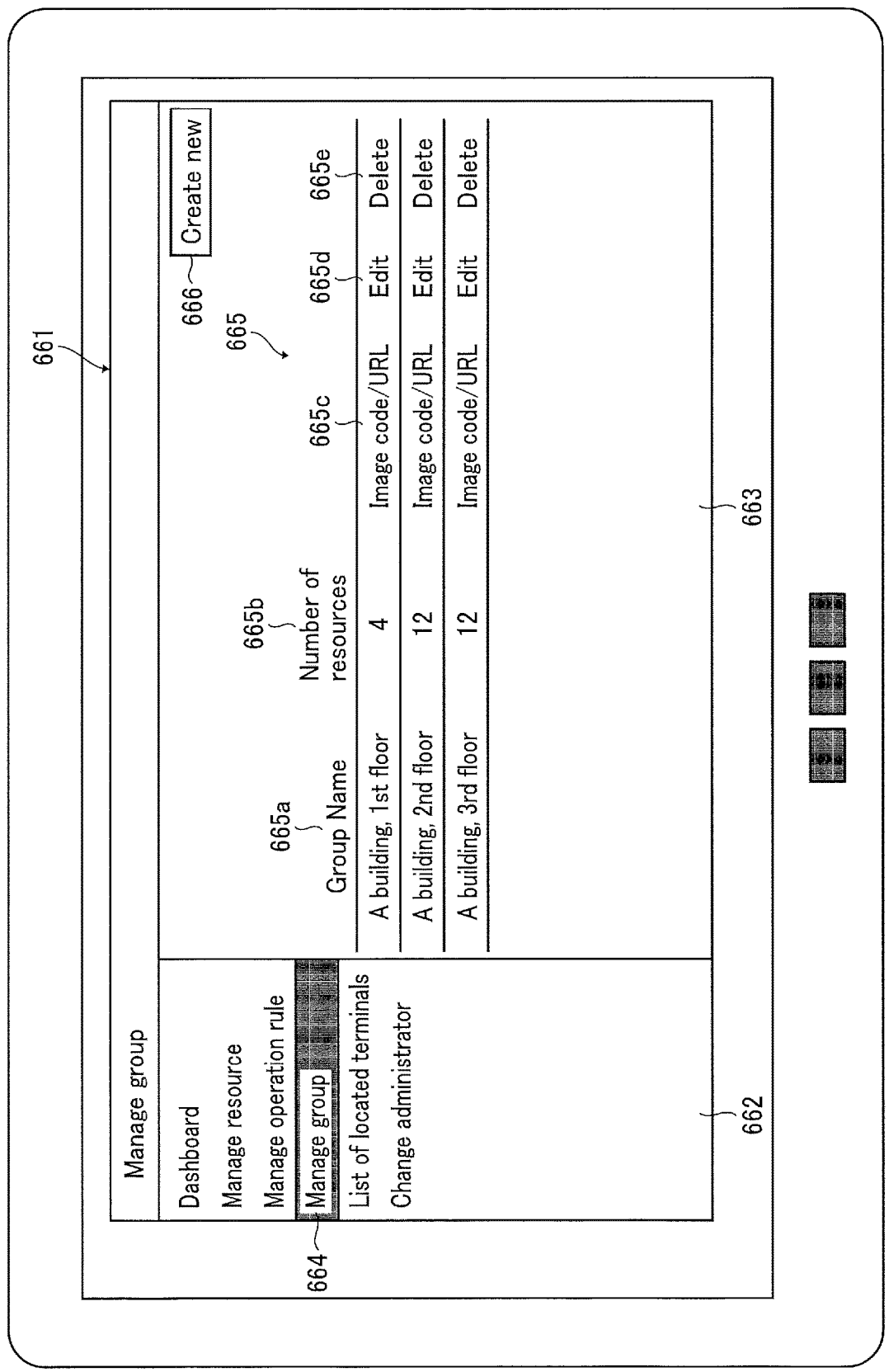
FIG. 14 is a diagram illustrating an example of a group management screen, according to the first embodiment of the present disclosure.

Next, in response to receiving the administrator information access response, the display control unit 64 of the PC 6 controls the display 606 to display a group management screen (e.g., a group list screen 661 as illustrated in FIG. 14) (step S27).

Figure 11:
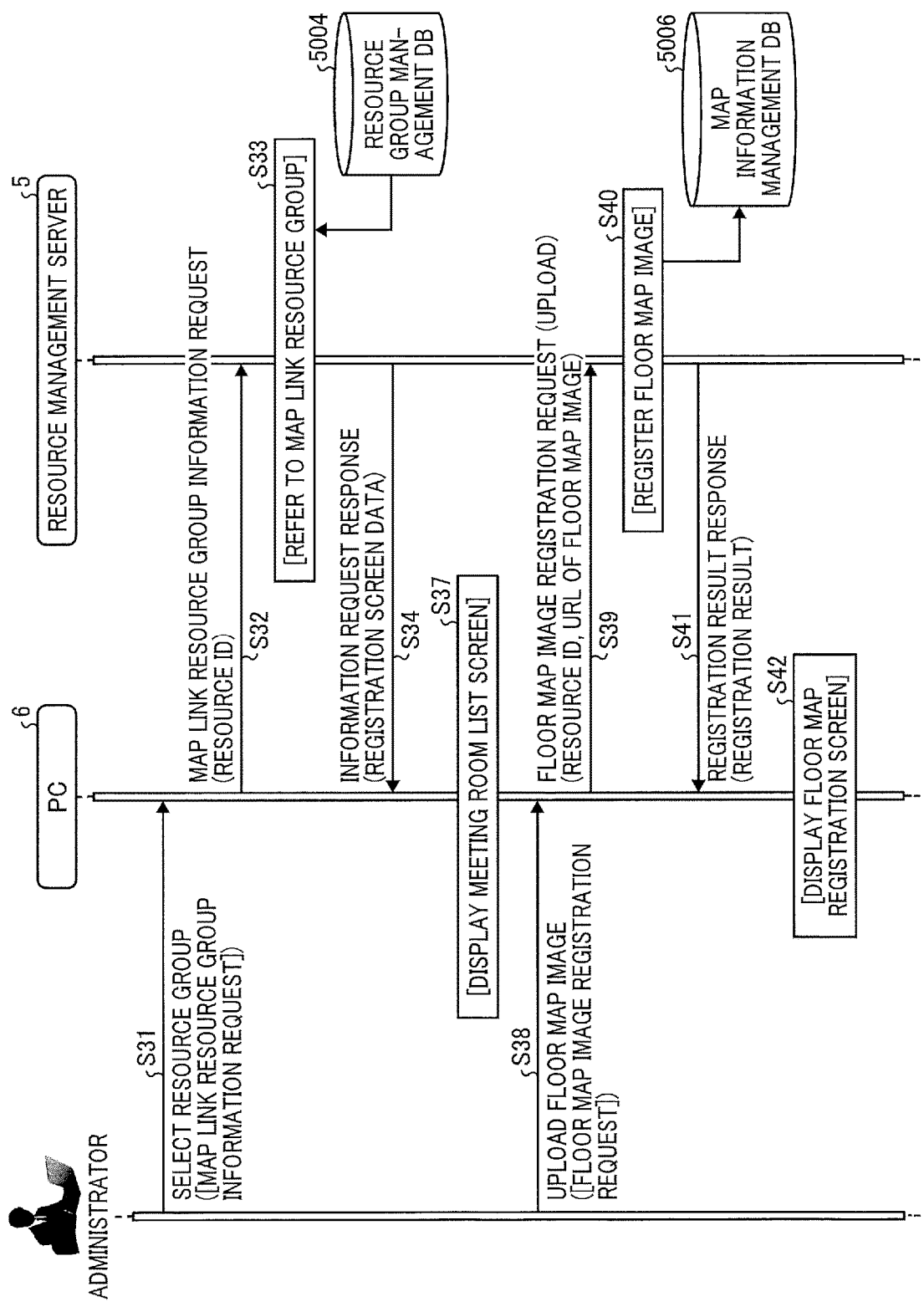
FIG. 11 is a sequence diagram illustrating an example of a floor map image registration in the link registration of the meeting room map, according to the first embodiment of the present disclosure.

Operation of Registering Meeting Room Map:

A description is now given an operation illustrated in a sequence diagram of FIG. 11. FIG. 11 is a sequence diagram illustrating an example of a floor map image registration in the link registration of the meeting room map, according to the first embodiment. The administrator views the management screen displayed on the display 606 of the PC6 and presses, clicks, or taps an edit button 665d corresponding to a group name (e.g., A Building, 1st floor) on the screen displayed in FIG. 14, to select the resource group (map link resource group information request). Thereby, the acceptance unit 62 of the PC 6 receives the operation input by the administrator (step S31).

Next, the transmission/reception unit 61 transmits the map link resource group information request including the resource ID to the resource management server 5 (step S32). Thereby, the transmission/reception unit 51 of the resource management server 5 receives the map link resource group information request including the resource ID transmitted from the PC 6.

In response to receiving the map link resource group information request including the resource ID, the storing/reading processing unit 59 of the resource management server 5 searches the resource group management table (see FIG. 7) using the received resource ID as a search key, to read the corresponding resource name and the like (step S33).

After the process of step S33, the transmission/reception unit 51 transmits an information request response including registration screen data to be displayed to the PC 6 (step S34). Thereby, the transmission/reception unit 61 of the PC 6 receives the information request response including the registration screen data transmitted from the resource management server 5.

Next, the display control unit 64 controls the display 606 of the PC 6 to display, for example, a screen in which the group is added to a group management screen illustrated in FIG. 14 (step S37).

Next, the administrator performs an upload operation for registering a floor map image. Specifically, the administrator presses, clicks, or taps a "+ Add resource map" button 687 in FIG. 15 described below. Thereby, the acceptance unit 62 of the PC 6 receives the operation input to the "+ Add resource map" button 687 from the administrator (step S38). A floor map image registered in this step is, for example, an image as illustrated in FIG. 16 described below.

By the process of step S38, the transmission/reception unit 61 transmits, to the resource management server 5, a floor map image registration request, which is a request including the resource ID and an URL of an upload destination to which the floor map image is to be uploaded (step S39). Thereby, the transmission/reception unit 51 of the resource management server 5 receives the request transmitted from the PC 6, the request including the resource ID and the URL of the upload destination to which the floor map image is to be uploaded.

Figure 16:
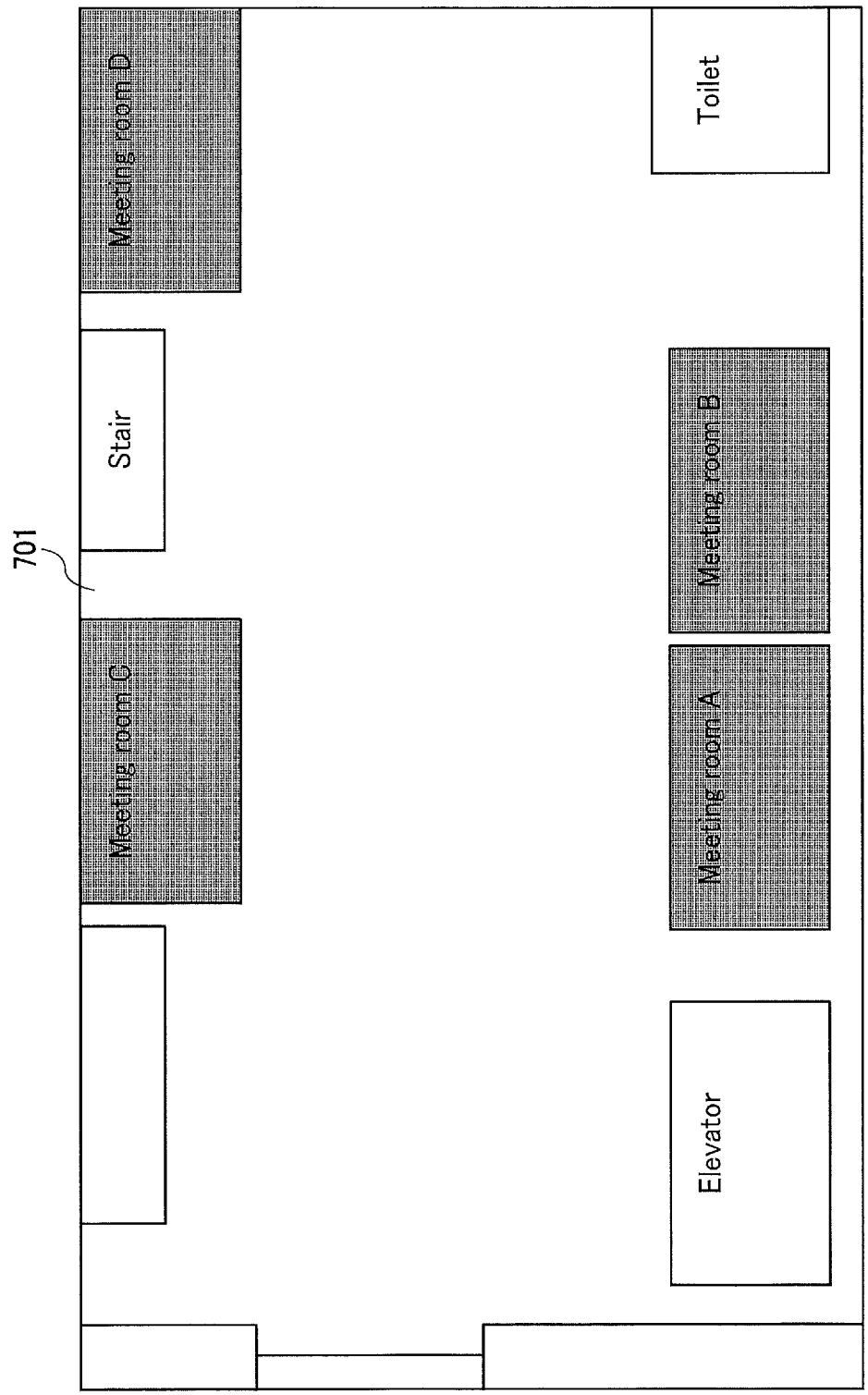
FIG. 16 is a diagram illustrating an example of a floor map for registration, according to the first embodiment of the present disclosure.

In response to receiving from the PC 6 the request including the resource ID and the URL of the upload destination to which the floor map image is to be uploaded, the storing/reading processing unit 59 of the resource management server 5 registers the resource ID and the map image file (URL) of the meeting room as illustrated in FIG. 16 to the map information management table (see FIG. 8B) (step S40).

Next, the transmission/reception unit 51 transmits a registration result response to the PC 6 (step S41). Thereby, the transmission/reception unit 61 of the PC 6 receives the registration result response transmitted from the resource management server 5.

Figure 15:
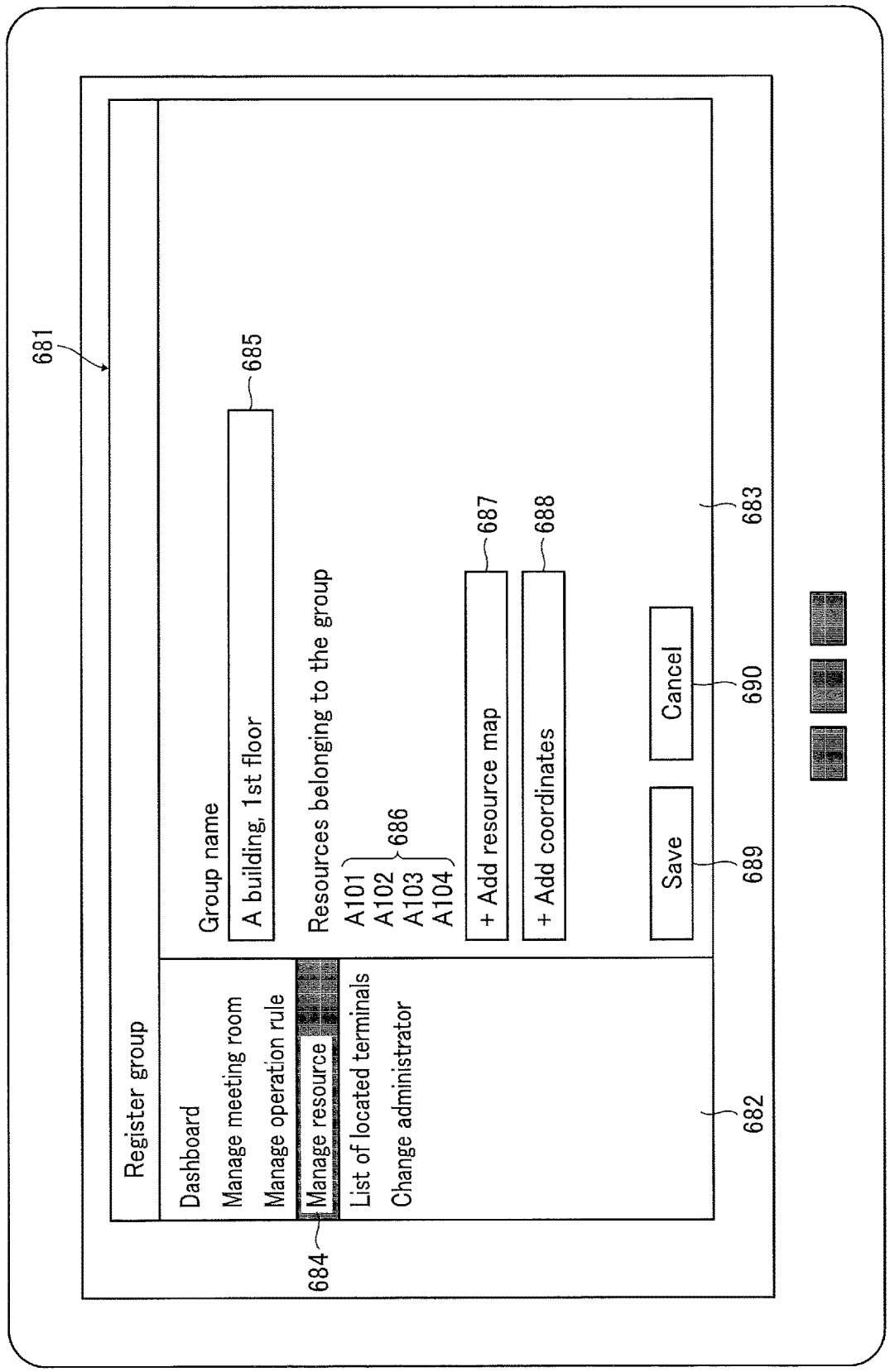
FIG. 15 is a diagram illustrating an example of a group registration screen, according to the first embodiment of the present disclosure.

In response to receiving the registration result response from the resource management server 5, the display control unit 64 of the PC 6 controls the display 606 of the PC 6 to display, for example, a group registration screen as illustrated in FIG. 15 described below (step S42).

Figure 12:
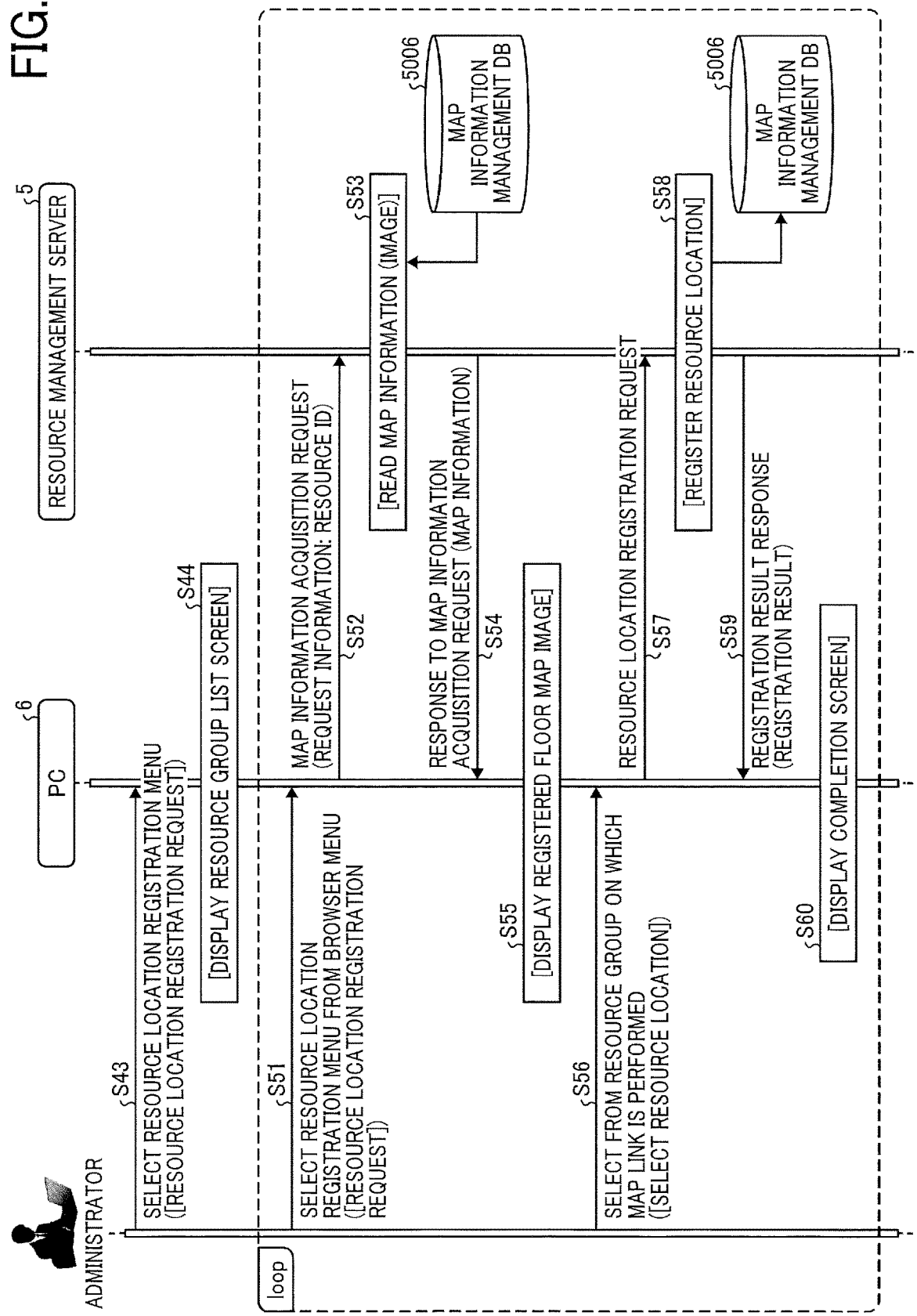
FIG. 12 is a sequence diagram illustrating an example of a resource location registration in the link registration of the meeting room map, according to the first embodiment of the present disclosure.

Operation of Registering Resource Location in Meeting Room Map:

A description is now given an operation illustrated in a sequence diagram of FIG. 12.

FIG. 12 is a sequence diagram illustrating an example of a resource location registration in the link registration of the meeting room map, according to the first embodiment. The administrator views the group registration screen, and presses, clicks, or taps a "+ Add coordinates" button 688 illustrated in FIG. 15, to select a resource location registration menu and makes a resource location registration request. Thereby, the acceptance unit 62 of the PC 6 accepts the operation input to the "+ Add coordinates" button 688 (step S43).

In response to the resource location registration request, the PC 6 controls the display 606 to display a belonging meeting room list screen as a resource group list screen (step S44).

Next, the administrator selects a resource location registration menu from the browser menu. Specifically, the administrator selects a desired resource from a resource list 686 in a "Resources belonging to the group" field illustrated in FIG. 15 (resource location registration request). Thereby, the acceptance unit 62 of the PC 6 receives the resource selected by the administrator from the "Resources belonging to the group" (step S51).

Next, the transmission/reception unit 61 transmits, to the resource management server 5, a map information acquisition request including the resource ID as request information (step S52). Thereby, the transmission/reception unit 51 of the resource management server 5 receives the map information acquisition request as the request information transmitted from the PC 6, the map information acquisition request including the resource ID.

In response to receiving the map information acquisition request including the resource ID as the request information, the storing/reading processing unit 59 searches the map information management table (see FIG. 8B) using the resource ID as a search key, to read a corresponding map information file (also referred to as a "location information file") (step S53).

After the process of step S53, the transmission/reception unit 51 transmits, to the PC 6, as a map information acquisition response, the map information file from the map information management table and location information (also referred to as "map information") including the coordinates in the x-axis direction and the y-axis direction (step S54). Thereby, the transmission/reception unit 61 of the PC 6 receives the map information response indicated by the location information transmitted from the resource management server 5.

Figure 17:
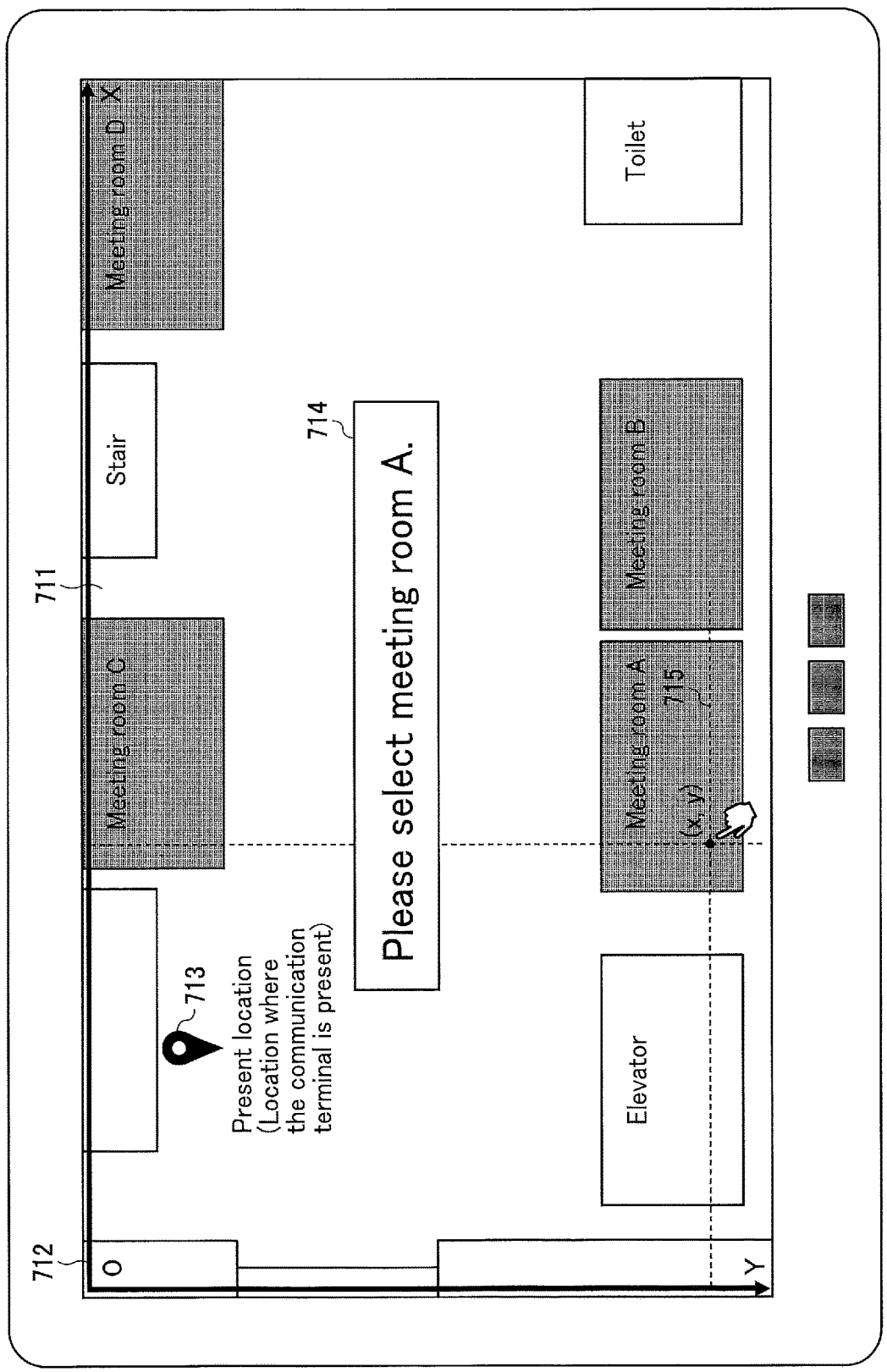
FIG. 17 is a diagram illustrating an example of setting coordinates on the floor map, according to the first embodiment of the present disclosure.

After the process of step S54, the display control unit 64 of the PC 6 controls the display 606 to display, for example, the floor map image as illustrated in FIG. 17 (step S55). The floor map image is a portable document format (PDF) file, for example. A detailed description is given below of this floor map image, with reference to screen examples described below.

Next, the administrator performs an operation such as pressing, clicking, or tapping a desired position in the meeting room A, according to a message "Please select meeting room A", for example displayed on the floor map image on the display 606 as illustrated in FIG. 17, for example. Thereby, the acceptance unit 62 receives the operation of selecting the resource location, the operation being performed by the administrator (step S56).

In response to receiving the operation of step S56 by the acceptance unit 62, the transmission/reception unit 61 transmits the resource location registration request to the resource management server 5 (step S57). Thereby, the transmission/reception unit 51 of the resource management server 5 receives the resource location registration request transmitted from the PC 6. This resource location registration request includes information on absolute coordinates (x, y) with respect to the floor map image, the absolute coordinates assigned by the administrator's operation on the display 606. In other words, the transmission/reception unit 61 transmits information for registering the image of the meeting room A in the floor map image displayed on the display 606 and the absolute coordinates indicating the location of the meeting room A to the resource management server 5.

In response to receiving the resource location registration request transmitted from the PC 6, the storing/reading processing unit 59 of the resource management server 5 writes information on the absolute coordinates (x, y) received in step S57 in each of the field of the X-axis direction and the field of Y-axis direction coordinate of the map image file associated with the resource ID received in step S52 (step S58).

After the process of step S58, the transmission/reception unit 51 transmits information such as text information indicating the registration result to the PC 6 as a registration result response (step S59). Thereby, the transmission/reception unit 61 of the PC 6 receives the information indicating the registration result transmitted from the resource management server 5.

After the process of step S59, the display control unit 64 controls the display 606 to displays, for example, the group registration screen as illustrated in FIG. 15 (step S60).

The processes from steps S51 to S60 as the operation of registering the resource location in the meeting room map are repeated for the number of resources (meeting rooms) for which location information (coordinates) is to be registered.

Note that the processes from steps S51 to S60 are examples, and the content, order, and the like of the processes performed by the resource management system 1 are not limited to such examples provided that they do not depart from the gist of the present disclosure.

Examples of Screens:

FIG. 13 is a diagram illustrating an example of the login screen in the activation, according to the first embodiment. When the process of step S22 described above is performed, the display control unit 64 of the PC 6 controls the display 606 to display the login screen 651 as illustrated in FIG. 13. On the login screen 651, an "Email address" input field 652 and a "Next" button 653 are displayed. The login screen 651 enables the administrator to make the administrator page access request described with reference to step S23.

FIG. 14 is a diagram illustrating an example of the group management screen, according to the first embodiment. When the process of step S27 described above is performed, the display control unit 64 of the PC 6 controls the display 606 to display the group list screen 661 as illustrated in FIG. 14. The group list screen 661 includes a menu field 662 and a group display field 663. The menu field 662 includes a group management button 664. The group display field 663 includes, as a group list 665, items of a group name 665a, the number of resources 665b, an image code/URL 665c, the edit button 665d, and a delete button 665e. The group display field 663 further includes a "Create new" button 666.

FIG. 15 is a diagram illustrating an example of the group registration screen, according to the first embodiment. When the processes of steps S37, S42, and S60 described above are performed, the display control unit 64 of the PC 6 controls the display 606 to display the group registration screen 681 as illustrated in FIG. 15. The group registration screen 681 includes a menu field 682 and a selected resource display field 683. The menu field 682 includes a group management button 684. The selected resource display field 683 includes a group name input field 685, a resource list 686, the "+ Add resource map" button 687, the "+ Add coordinates" button 688, a save button 689, and a cancel button 690.

FIG. 16 is a diagram illustrating an example of a floor map for registration, according to the first embodiment. As illustrated in FIG. 16, in a floor map image 701, meeting rooms A, B, C and D, a toilet, and an elevator, each being a resource, are arranged at their respective positions.

FIG. 17 is a diagram illustrating an example of setting coordinates on the floor map, according to the first embodiment. When the process of step S55 described above is performed, the display control unit 64 of the PC 6 controls the display 606 to display a registration floor map image 711 as illustrated in FIG. 17. In the registration floor map image 711, X-Y coordinates 712 re displayed in which a horizontal direction is an X-axis, and a vertical direction is a Y-axis, with an upper-left vertex of the map image indicated by a rectangle being an origin O. A memory of the X-Y coordinates is indicated by pixels ([px]), for example, as illustrated in the map information management table of FIG. 18B. Further, in the X-Y coordinates, coordinates (x, y) 715 are drawn in the meeting room A. The coordinates (x, y) 715 are assigned by, for example, performing the processes of steps S43 and S56 described above, according to the operation by the administrator. Further, in the registration floor map image 711 of FIG. 17, a current location symbol 713 indicating a current location is displayed in addition to the resources. Further, near the center of the registration floor map image 711, a "Please select meeting room A" message 714 is further displayed, which prompts the selection of a resource (meeting room) to which the coordinates as the location information is to be assigned. Although in the present embodiment, the message prompting the selection of the meeting room A is displayed, this is just an example. In another example, a message prompting the selection of any of the other meeting rooms B, C, and D is displayed.

Figure 18:
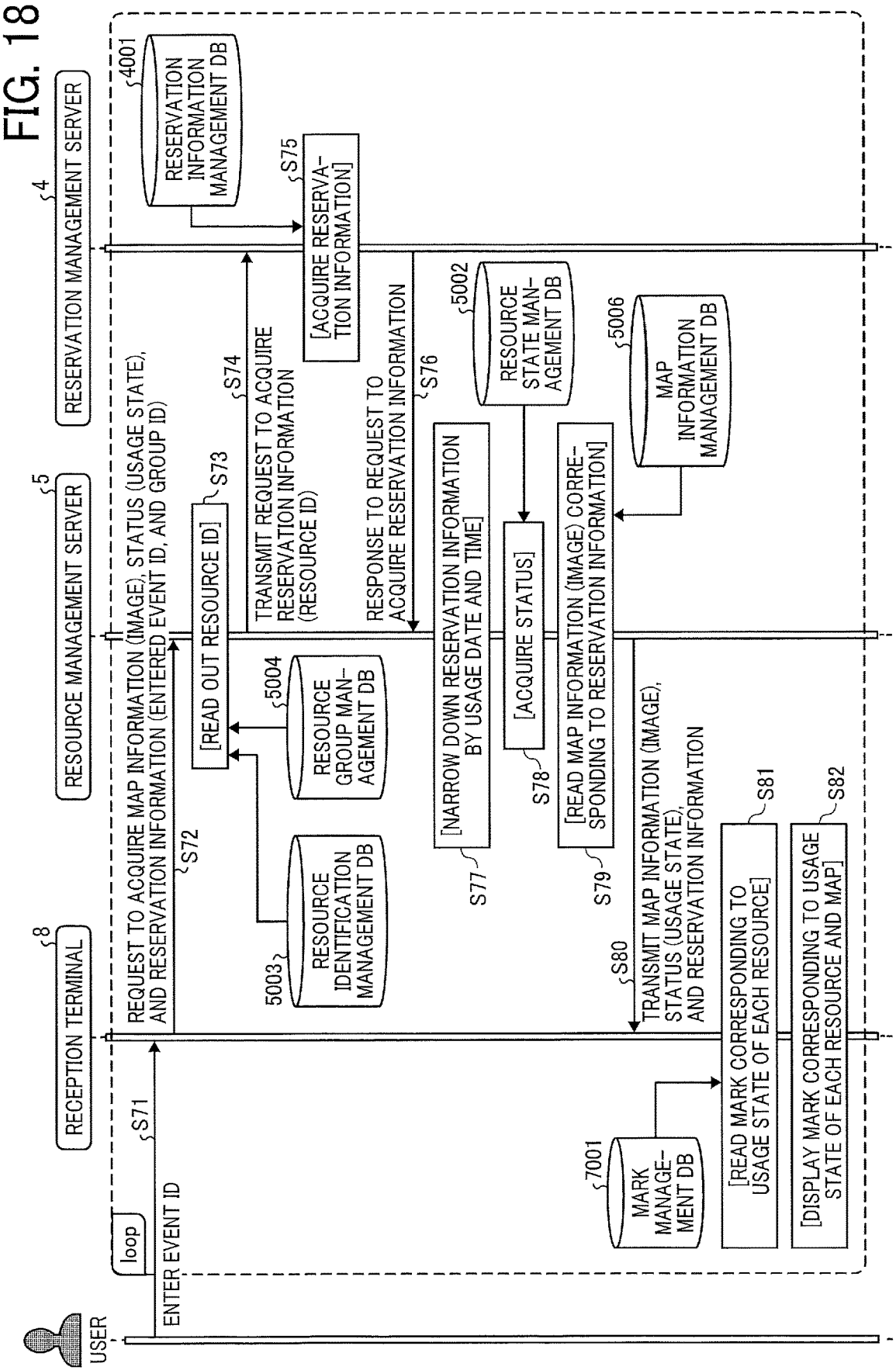
FIG. 18 is a sequence diagram illustrating an example of displaying the floor map on the reception terminal, according to the first embodiment of the present disclosure.

Operation of Displaying Meeting Room Map:

FIG. 18 is a sequence diagram illustrating an example of displaying a floor map on the reception terminal 8, according to the first embodiment. As illustrated in FIG. 18, first, a user of a meeting room, which is an example of the resource, enters an event ID to the reception terminal 8 located on a floor including the meeting room to be used (e.g., the meeting room C). Thereby, the acceptance unit 82 of the reception terminal 8 receives the input of the event ID from the user (step S71). Further, in step S71, the identification information (resource ID) of the meeting room to be used is also input to the reception terminal 8 according to an operation by the user. Note that a linking processing between a customer and each resource (meeting room) is first performed for each reception terminal 8. By this linking processing, the reception terminal 8 and the group ID of each meeting room are linked.

The event ID is input, for example, by the user's operation of designating the meeting room C using a user interface (UI) of the reception terminal 8 and inputting information on the start of use (check-in). For example, the user presses, clicks, or taps "waiting for entry" of the resource (e.g., the meeting room C) reserved by the user himself or herself In response to such user's operation, the reception terminal 8 displays an event ID input screen to allow the user to input the event ID.

Next, the transmission/reception unit 81 of the reception terminal 8 transmits, to the resource management server 5, the event ID and the group ID each being input by the user, in order to receive the location information indicating the location of each resource, the usage state of each resource, and the reservation information relating to each resource (step S72). Thereby, the transmission/reception unit 51 of the resource management server 5 receives the event ID and the group ID transmitted from the reception terminal 8.

Next, the storing/reading processing unit 59 of the resource management server 5 searches the resource group management table (see FIG. 7) using the group ID received by the transmission/reception unit 51 as a search key to read the associated resource ID. However, at this stage, there is a case where plural resource IDs are read. To address such case, the storing/reading processing unit 59 further searches the resource identification management table (see FIG. 6C) using the event ID as a search key to read the associated resource ID (step S73). In another example, in the present embodiment, the resource group management table (resource group management DB 5004) and the resource identification management table (resource identification management DB 5003) is configured to collectively function as a resource management table.

Next, the transmission/reception unit 51 transmits a reservation information acquisition request to the reservation management server 4 (step S74). Thereby, the transmission/reception unit 41 of the reservation management server 4 receives the reservation information acquisition request transmitted from the resource management server 5. The reservation information acquisition request includes the resource ID read in step S73.

The storing/reading processing unit 49 searches the reservation information management table (see FIG. 5) using the resource ID received by the transmission/reception unit 41 as a search key to read the associated reservation information (the reservation ID, the reservation-making user account, the start date and time, the end date and time, and the expected participant accounts) (step S75).

Next, the transmission/reception unit 41 transmits the reservation information read by the storing/reading processing unit 49 to the resource management server 5 as a response to the reservation information acquisition request (step S76). Thereby, the transmission/reception unit 51 of the resource management server 5 receives the response to the reservation information acquisition request transmitted from the reservation management server 4.

In response to receiving the response to the reservation information acquisition request transmitted from the reservation management server 4, the determination unit 55 of the resource management server 5 acquires the current time from the timer 53. The determination unit 55 narrows down the acquired reservation information based on a usage date and time. Specifically, the determination unit 55 determines whether each information of the start date and time and the end date and time included in the received reservation information includes the current time, to extract the reservation-making user account that satisfies the determination condition (step S77). In other words, the determination unit 55 determines whether the acquired current time is included between the start date and time and the end date and time included in the received reservation information, to extract the reservation-making user account that satisfies the determination condition.

Further, the storing/reading processing unit 59 searches the resource state management table (see FIG. 6B) using the reservation-making user account extracted in step S77 as a search key to read out the reservation state of the corresponding resource (step S78). In other words, the storing/reading processing unit 59 acquires the status of the corresponding resource.

Further, the storing/reading processing unit 59 searches the map information management table (see FIG. 8B) using the resource ID read in step S73 as a search key to read the corresponding map image file (URL) (step S79).

Next, the transmission/reception unit 51 transmits, to the reception terminal 8, the map image file (URL) indicating the location information of each resource read in step S79, the resource status (usage state), and the reservation information (step S80). Thereby, the transmission/reception unit 81 of the reception terminal 8 receives the map image file (URL) indicating the location information of each resource, the resource status (usage state), and the reservation information transmitted from the resource management server 5.

In the resource management system 1 according to the present embodiment, when the processes of steps S72 and S80 described above are performed, an intervening apparatus or the like may be provided between the resource management server 5 (resource management apparatus) and the reception terminal 8 (communication terminal). In other words, the resource management system 1 may have a configuration in which the information transmitted or received between the resource management server 5 and the reception terminal 8 is transmitted or received via another apparatus.

In response to receiving the map image file (URL) indicating the location information of each resource, the resource status (usage state), and the reservation information by the transmission/reception unit 81, the storing/reading processing unit 89 searches the mark management table (see FIG. 9) using the resource status (i.e., the resource state) as a search key, to read the corresponding mark (step S81).

Figure 19:
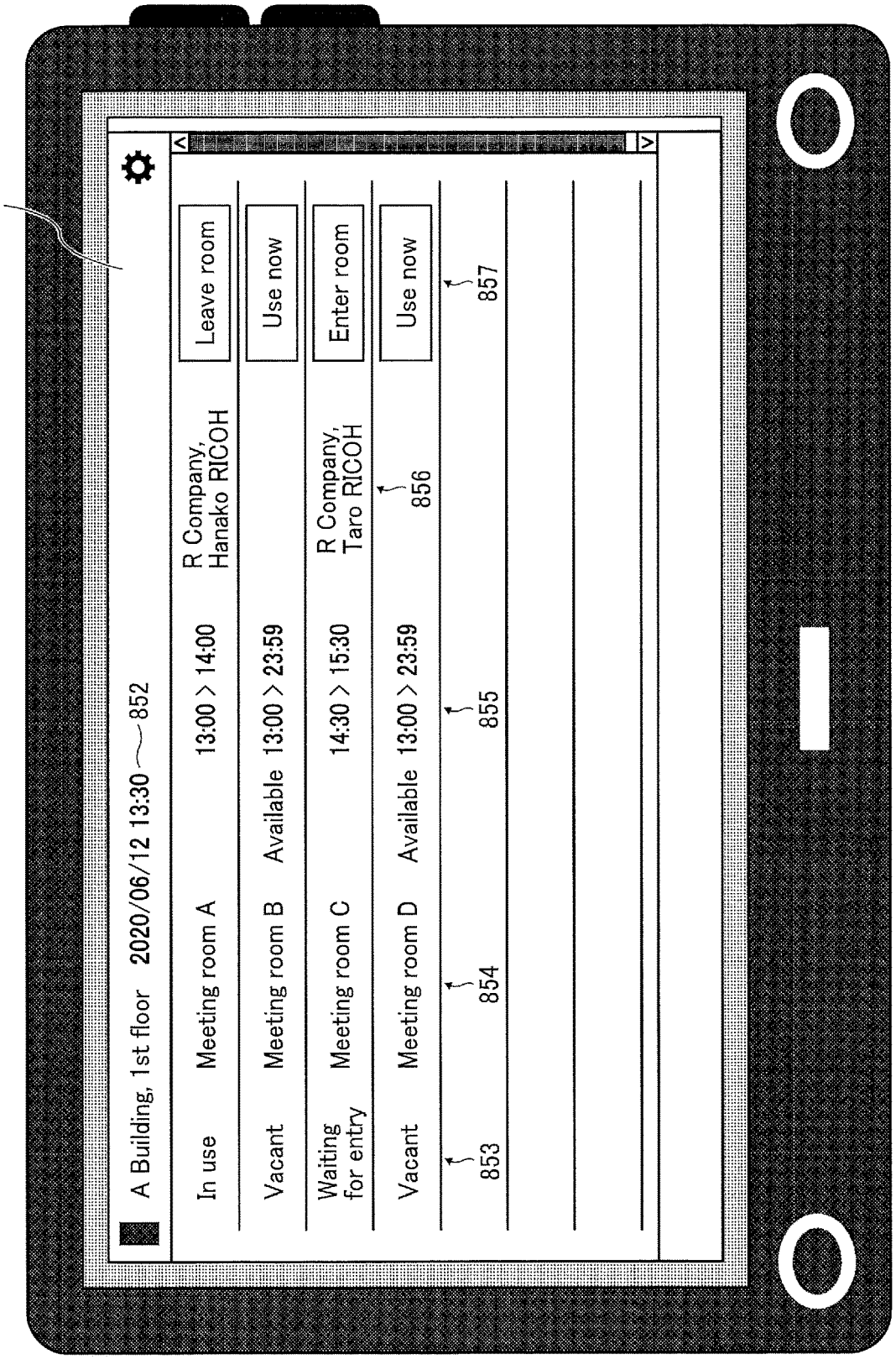
FIG. 19 is a diagram illustrating an example of a resource list display screen, according to the first embodiment of the present disclosure.
Figure 20:
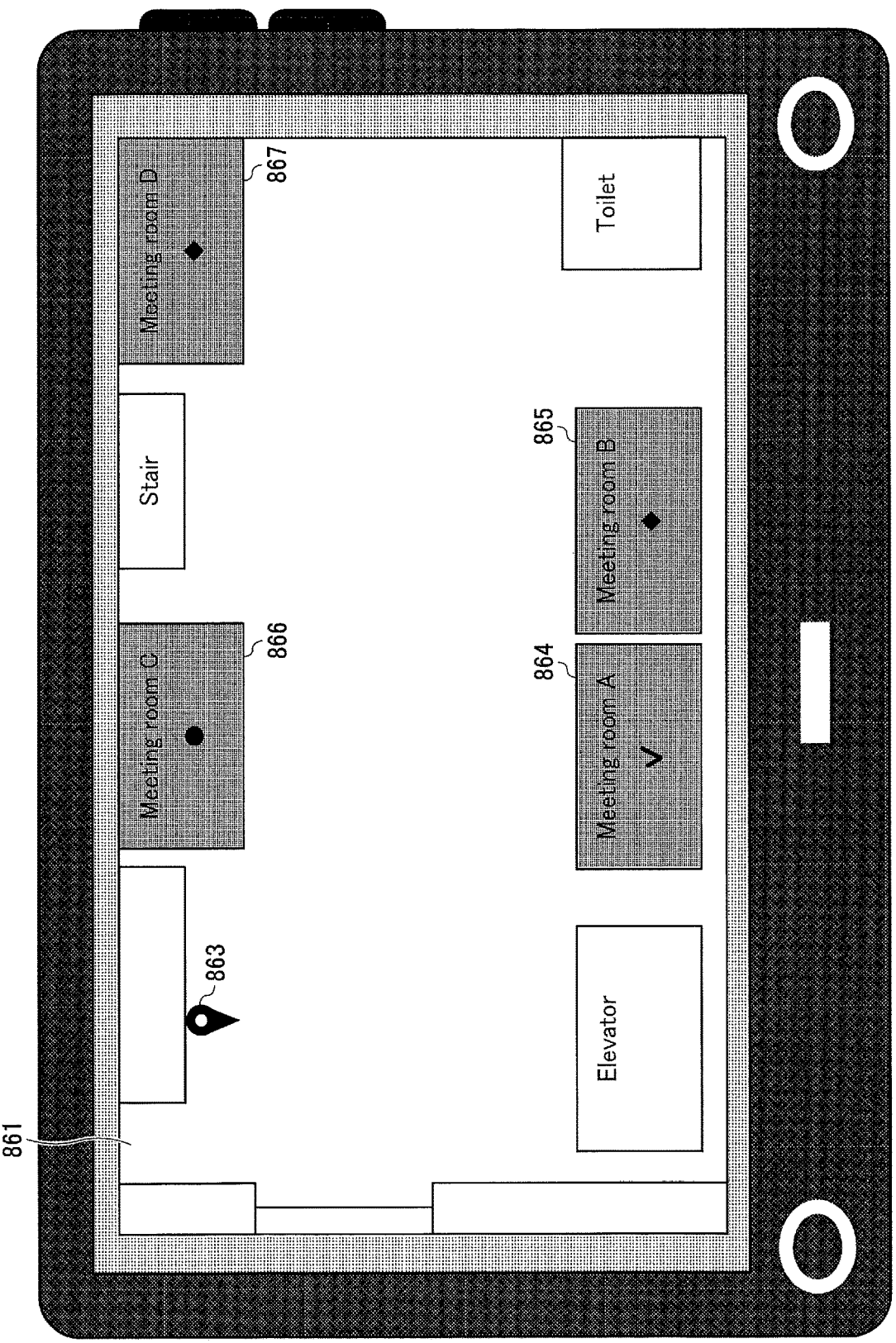
FIG. 20 is a diagram illustrating an example of a floor map display screen, according to the first embodiment of the present disclosure.

After the process of step S81, the display control unit 84 displays a list of reservation statuses of the resources as illustrated in FIG. 19, for example. Subsequently, as illustrated in FIG. 20, the display control unit 84 controls the display 818 to display the mark corresponding to the usage state of each resource as being combined with (superimposed on) the image represented by the image information of the each resource included in the map image file received in step S80 (step S82). A detailed description is given below of display forms of FIGS. 19 and 20 with reference to screen examples described below. For example, the transition from the screen of FIG. 19 to the screen of FIG. 20 is implemented by switching the screens at regular intervals given in advance or at predetermined time intervals set by the administrator. In another example, a "switching button" is provided on each screen of FIG. 19 and FIG. 20, thereby allowing the user to switch the screens from one to the other. In the present embodiment, the display control unit 84 functions as an example of the display control means.

Note that the processes from steps S71 to S82 are examples, and the content, order, and the like of the processes performed by the resource management system 1 are not limited to such examples provided that they do not depart from the gist of the present disclosure.

Example of Screen:

FIG. 19 is a diagram illustrating an example of a resource list display screen, according to the first embodiment. When the process of step S81 described above is performed, the display control unit 84 of the reception terminal 8 controls the display 718 to display a resource list display screen 851 as illustrated in FIG. 19. The resource list display screen 851 includes a location/date and time display field 852, a usage state display field 853, a resource display field 854, a reservation time display field 855, a customer display field 856, and a customer schedule display field 857. For example, the user can recognize that the meeting room A is currently in use by Hanako RICOH of R Company. Further, the user can recognize that the meeting room is in a state of waiting for entry by Taro RICOH of R Company.

FIG. 20 is a diagram illustrating an example of a floor map display screen, according to the first embodiment. When the process of step S82 described above is performed, the display control unit 84 of the reception terminal 8 controls the display 818 to display the floor map display screen 861 as illustrated in FIG. 20. The floor map display screen 861 includes a current location 863, a meeting room A 864, a meeting room B 865, a meeting room C 866, and a meeting room D 867. Further, in the meeting room A 864, the "check mark" indicating the state of in use is displayed as being combined (superimposed). In the meeting room B 865, the "♦" mark indicating the state of vacant is displayed as being combined (superimposed). In the meeting room C 866, the "●" mark indicating the state of waiting for entry is displayed as being combined (superimposed). In the meeting room D 867, the "+" mark indicating the state of vacant is displayed as being combined (superimposed).

As described heretofore, according to the first embodiment, the resource management server 5 transmits the request for reservation information indicating the reservation contents of each resource to the reservation management server 4 (step S74), receives the reservation information related to each resource transmitted by the reservation management server 4 (step S76), and transmits the location information indicating the location of each resource and the usage state of each resource each being managed by the resource management server 5, and the reservation information related to each resource received from the reservation management server 4 to the reception terminal 8 (step S80). This enables the user to recognize both of a location where a desired resource that the user wants to use is present and what kind of reservation information and usage state the desired resource has on the communication terminal that displays a list of usage states of a plurality of resources.

Second Embodiment

Figure 21:
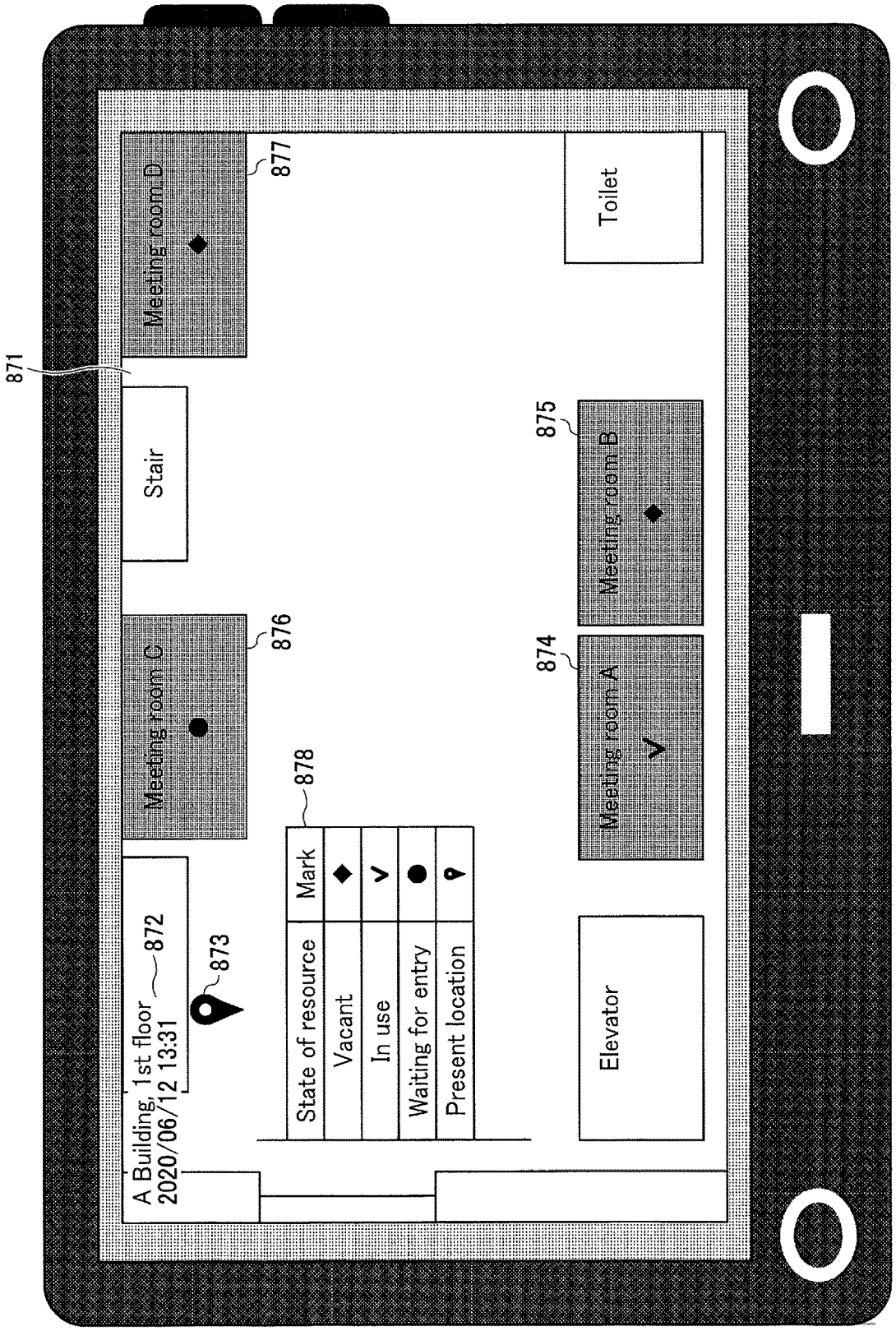
FIG. 21 is a diagram illustrating an example of the floor map display screen, according to the second embodiment of the present disclosure.

A description is now given of a second embodiment of the present disclosure, with reference to FIG. 21. In the second embodiment, a table format image of the mark management table (see FIG. 9) managed by the reception terminal 8 is displayed as being combined with (superimposed on) the floor map display screen displayed on the reception terminal 8. Since a system configuration, hardware configuration, and software function to which the second embodiment is applied are substantially the same as those described in the first embodiment, redundant descriptions thereof are omitted below. Processing in the second embodiment is mainly implemented by an operation by the display control unit 84 of combining (superimposing) the table format image of the mark management table (see FIG. 9) with (on) the floor map display screen at any suitable place in the process of steps S81 and S82 described above.

Example of Screen:

FIG. 21 is a diagram illustrating an example of a floor map display screen, according to the second embodiment. When the process of step S82 described above is performed, the display control unit 84 of the reception terminal 8 controls the display 818 to display a floor map display screen 871 as illustrated in FIG. 21. The floor map display screen 871 includes a location/date and time display field 872, a current location 873, a meeting room A 874, a meeting room B 875, a meeting room C 876, a meeting room D 877, and a mark management table 878. Further, in the meeting room A 874, the "check mark" indicating the state of in use is displayed as being combined (superimposed). In the meeting room B 875, the "♦" mark indicating the state of vacant is displayed as being combined (superimposed). In the meeting room C 876, the "●" mark indicating the state of waiting for entry is displayed as being combined (superimposed). In the meeting room D 877, the "♦" mark indicating the state of vacant is displayed as being combined (superimposed). In addition, the above-mentioned location/date and time display field 872 and mark management table 878 are displayed on the floor map display screen 871.

As described above, according to the second embodiment, the location/date and time display field 872 and the mark management table 878 are displayed on the floor map display screen 871 on the floor map display screen of the first embodiment. This enables the user to recognize both of a location where a desired resource that the user wants to use is present and what kind of reservation information and usage state the desired resource has on the communication terminal that displays a list of usage states of a plurality of resources and to further recognize the usage states of the resources on a single screen.

Third Embodiment

Figure 22:
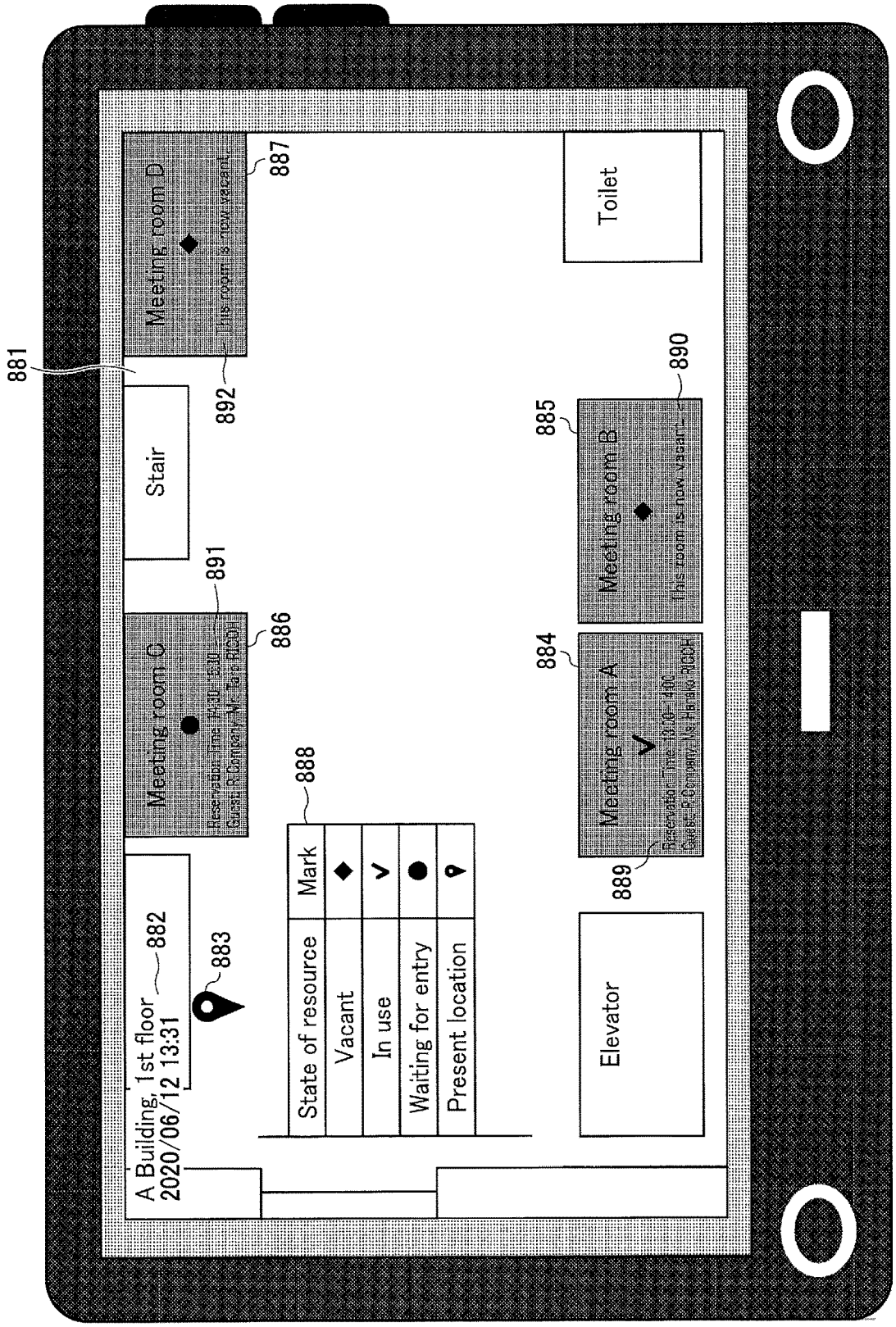
FIG. 22 is a diagram illustrating an example of the floor map display screen, according to the third embodiment of the present disclosure.

A description is now given of a third embodiment of the present disclosure, with reference to FIG. 22. In the third embodiment, the table format image of the mark management table (see FIG. 9) managed by the reception terminal 8 is displayed as being combined with (superimposed on) the floor map display screen displayed on the reception terminal 8, and the usage state of each resource is further displayed in (or near) the area of each resource. Since a system configuration, hardware configuration, and software function to which the third embodiment is applied are substantially the same as those described in the first embodiment, redundant descriptions thereof are omitted below. Processing in the third embodiment is mainly implemented by an operation by the display control unit 84 of combining (superimposing) the table format image of the mark management table (see FIG. 9) with (on) the floor map display screen at any suitable place in the process of steps S81 and S82 described above, and displaying the usage state of each resource in (or near) the area of each resource.

Example of Screen:

FIG. 22 is a diagram illustrating an example of a floor map display screen, according to the third embodiment. When the process of step S82 described above is performed, the display control unit 84 of the reception terminal 8 controls the display 818 to display a floor map display screen 881 as illustrated in FIG. 22. The floor map display screen 881 includes a location/date and time display field 882, a current location 883, a meeting room A 884, a meeting room B 885, a meeting room C 886, a meeting room D 887, and a mark management table 888. Further, in the meeting room A 884, the "check mark" indicating the state of in use is displayed as being combined (superimposed). In the meeting room B 885, the "♦" mark indicating the state of vacant is displayed as being combined (superimposed). In the meeting room C 886, the "●" mark indicating the state of waiting for entry is displayed as being combined (superimposed). In the meeting room D 887, the "♦" mark indicating the state of vacant is displayed as being combined (superimposed). In addition, the above-mentioned location/date and time display field 882 and mark management table 888 are displayed on the floor map display screen 881. Further, in (or near) the area of each resource represented by a rectangle, the reservation information of each resource transmitted by the resource management server 5 in step S80 is displayed as text, for example. In the example of FIG. 22, in the area of the meeting room A, text "Reservation time: 13:00-14:00; Guest: R Company, Ms. Hanako RICOH" 889 is displayed as the current reservation information of the resource A. In substantially the same manner, in the area of the meeting room C, text "Reservation time: 14:30-15:30; Guest: R Company, Mr. Taro RICOH" 891 is displayed as the reservation information after the current time of the resource A.

In each of the configurations described with reference to FIG. 20 to FIG. 22, the floor map display screen 861, the floor map display screen 871, and the floor map display screen 881 are displayed on the same display 818. In substantially the same manner, the resources (e.g., the meeting room A 864, the meeting room 874, and the meeting room 884) and other configurations represent the same object.

As described above, according to the third embodiment, the location/date and time display field 882 and the mark management table 888 are displayed on the floor map display screen 871 on the floor map display screen of the second embodiment. Further, the reservation information of each resource is displayed in (or near) the area of each resource. This enables the user to recognize both of a location where a desired resource that the user wants to use is present and what kind of reservation information and usage state the desired resource has on the communication terminal that displays a list of usage states of a plurality of resources and to further recognize details of the usage states of the resources on a single screen.

A meeting room reservations system is known, which includes a management server, an operation terminal, plural terminals, each being provided near an entrance of a meeting room, and a comprehensive guidance terminal. On a comprehensive guidance screen of the comprehensive guidance terminal, one of three statuses of "in use", "reserved", and "vacant" is displayed as a reservation status of each meeting room.

However, in the known meeting room reservation system, although a resource name and a usage state are displayed on a communication terminal that displays a list of reservations and usage states of a plurality of meeting rooms, which is an example of a plurality of resources, a location of the resource is not a target for display. Therefore, on the communication terminal that displays the list of reservations and usage states of the plurality of meeting rooms, a user of the resource recognize neither where a desired resource that the user wants to use exists nor what kind of reservation information and usage state the desired resource has.

According to one or more embodiments of the present invention, a communication terminal that displays a list of usage states of a plurality of resources enables a user to recognize both of a place where a desired resource that the user wants to use exists and what kind of reservation information and usage state the desired resource has.

Variations:

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The resource management system 1 of the present embodiment may also be referred to as a "web service". The web service refers to various services provided by the internet-related technologies. Examples of the web service include various rental services including a meeting room rental service. A system that uses the web service is called a usage system.

The resource management system 1 of the embodiments can also be divided into the larger number of processing units according to the processing contents. Further, one process can be divided to include the larger number of processes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

The invention claimed is:

1. A resource management apparatus communicable with a communication terminal that displays usage states of a plurality of resources, the resource management apparatus comprising circuitry configured to transmit a request for reservation information indicating reservation contents of the plurality of resources to a reservation management apparatus that manages reservations of the plurality of resources, receive the reservation information relating to the plurality of resources transmitted by the reservation management apparatus, the received reservation information including a reservation time and user information, and transmit, for the communication terminal to display an image including areas respectively indicating a location of each resource among the plurality of resources, the image including (i) a mark indicating a usage state, (ii) a reservation time, and (iii) user information, in each of the areas, to the communication terminal, image information of the plurality of resources, location information indicating locations of the plurality of resources, usage states of the plurality of resources, and the received reservation information including the reservation time and the user information, the image information, the location information, and the usage states being managed by the resource management apparatus.

2. The resource management apparatus of claim 1, wherein the circuitry receives an acquisition request for acquiring the location information, the usage states of the plurality of resources, and the reservation information relating to the plurality of resources, and transmits, to the reservation management apparatus, resource identification information identifying the plurality of resources corresponding to the received acquisition request.

3. The resource management apparatus of claim 2, further comprising a memory that stores a resource management table storing information items included in the acquisition request and the resource identification information in association with each other, wherein the circuitry transmits, to the reservation management apparatus, one or more particular resource identification information that is associated with the acquisition request and is read from the resource management table.

4. The resource management apparatus of claim 3, wherein the memory further stores a resource state management table storing the resource identification information and the usage states of the plurality of resources in association with each other, and the circuitry transmits, to the communication terminal, the usage states of one or more resources corresponding to the one or more particular resource identification information read from the resource state management table.

5. The resource management apparatus of claim 3, wherein the memory further stores a map information management table storing the resource identification information and the location information in association with each other, and the circuitry reads one or more location information associated with the one or more particular resource identification information in the map information management table, and transmits the read one or more location information to the communication terminal.

6. The resource management apparatus of claim 5, wherein the circuitry receives a map image registration request for registering the location information from an administrator terminal that receives an operation of registering the location information, and registers images of the plurality of resources in the map information management table in response to the received map image registration request.

7. The resource management apparatus of claim 6, wherein the circuitry receives a location registration request for registering locations of the plurality of resources from the administrator terminal, and registers the locations of the plurality of resources in the map information management table in response to the received location registration request.

8. The resource management apparatus of claim 1, wherein the circuitry is configured to receive a location registration request for registering locations of the plurality of resources from an administrator terminal, the location registration request including a set of two coordinates for each resource among the plurality of resources; each set of two coordinates indicating a position of a respective resource on an image map; wherein each of the coordinates is expressed with a pixel value as a unit of distance.

9. A resource management system comprising:

a resource management apparatus including first circuitry;

a reservation management apparatus;

and a communication terminal including second circuitry, wherein the first circuitry of the resource management apparatus is configured to transmit a request for reservation information indicating reservation contents of the plurality of resources to the reservation management apparatus that manages reservations of the plurality of resources, receive the reservation information relating to the plurality of resources transmitted by the reservation management apparatus, the received reservation information including a reservation time and user information, and transmit, to the communication terminal, image information of the plurality of resources, location information indicating locations of the plurality of resources, usage states of the plurality of resources, and the received reservation information including the reservation time and the user information the image information, the location information, and the usage states being managed by the resource management apparatus; and the second circuitry of the resource management apparatus is configured to display an image including areas respectively indicating a location of each resource among the plurality of resources, the displayed image including (i) a mark, indicating a usage state, (ii) a reservation time, and (iii) user information, in each of the areas.

10. The resource management system of claim 9, wherein the communication terminal comprises a memory to store a mark management table storing marks in association with the usage states of the plurality of resources transmitted by the resource management apparatus, and the second circuitry of the communication terminal displays, on the communication terminal, the marks corresponding the usage states of the plurality of resources, the marks being combined with images represented by image information of the plurality of resources.

11. The resource management system of claim 10, wherein the second circuitry of the communication terminal switches, at a predetermined time interval, between a screen displaying a floor map and a screen displaying a list of the reservation statuses of the resources.

12. A non-transitory computer-executable medium storing a program that causes a resource management apparatus communicable with a communication terminal that displays usage states of a plurality of resources to perform a method comprising:

transmitting a request for reservation information indicating reservation contents of the plurality of resources to a reservation management apparatus that manages reservations of the plurality of resources; and receiving the reservation information relating to the plurality of resources transmitted by the reservation management apparatus, the received reservation information including a reservation time and user information, transmitting, for the communication terminal to display an image including areas respectively indicating a location of each resource among the plurality of resources, the image including (i) a mark indicating a usage state, (ii) a reservation time, and (iii) user information, in each of the areas, to the communication terminal, image information of the plurality of resources, location information indicating locations of the plurality of resources, usage states of the plurality of resources, and the received reservation information including the reservation time and the user information, the image information, the location information, and the usage states being managed by the resource management apparatus.

* * * * *